US012614989B2

(12) United States Patent　　　　　(10) Patent No.:　US 12,614,989 B2
Sugimoto　　　　　　　　　　　　　　(45) Date of Patent:　Apr. 28, 2026

(54) POWER CONVERTER

(71) Applicant: Mazda Motor Corporation, Hiroshima (JP)

(72) Inventor: Manabu Sugimoto, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 214 days.

(21) Appl. No.: 18/731,760

(22) Filed: Jun. 3, 2024

(65) Prior Publication Data

US 2024/0421721 A1　Dec. 19, 2024

(30) Foreign Application Priority Data

Jun. 16, 2023　(JP) ................................. 2023-099462

(51) Int. Cl.
　　*H02M 7/00*　　　(2006.01)
　　*B60L 15/00*　　　(2006.01)
　　*H02K 5/04*　　　(2006.01)
　　*H02K 11/33*　　　(2016.01)
(52) U.S. Cl.
　　CPC ........... *H02M 7/003* (2013.01); *B60L 15/007*
　　　(2013.01); *H02K 5/04* (2013.01); *H02K 11/33*
　　　　　　　　　　　　　　　　　　(2016.01)
(58) Field of Classification Search
　　CPC ..... H02M 7/003; H02M 7/797; B60L 15/007;
　　　　　　H02K 5/04; H02K 11/33; H05K 7/14329;
　　　　　　　　　　　　　　　　　　H01R 31/06
　　USPC ................................................ 310/68 D, 71
　　See application file for complete search history.

(56) References Cited

U.S. PATENT DOCUMENTS

| | | | | |
|---|---|---|---|---|
| 2013/0265808 A1* | 10/2013 | Ishii | ......................... | H02M 1/12 |
| | | | | 363/97 |
| 2013/0278194 A1 | 10/2013 | Numakura | | |
| 2014/0140119 A1* | 5/2014 | Shinohara | ............... | B60L 53/22 |
| | | | | 363/141 |
| 2024/0303846 A1* | 9/2024 | Peng | ......................... | G06T 7/50 |
| 2024/0421507 A1* | 12/2024 | Sugimoto | .............. | H02K 5/225 |
| 2024/0421721 A1* | 12/2024 | Sugimoto | ................ | H02K 5/04 |

FOREIGN PATENT DOCUMENTS

JP　　　　　　5455887 B2　　3/2014

* cited by examiner

*Primary Examiner* — Ahmed Elnakib
(74) *Attorney, Agent, or Firm* — Alleman Hall LLP

(57)　　　　　　　ABSTRACT

A power converter includes a power module part having n power modules and a connector part having n busbars and a connector. First and second busbars to first and second power modules respectively have first and second connecting parts to the connector, module-side connecting parts to the power modules, and first and second coupling parts coupling the connecting part to the module-side connecting part. The connector has connection points disposed in a plane intersecting a first direction. The connection points for the first and second connecting parts are first and second connection points, respectively, and are offset so that the first connection point is closer to the power module part in a second direction intersecting the first direction. The second coupling part is longer than the first coupling part, and is routed to bypass outside an area where the connection points are disposed, when seen in the first direction.

20 Claims, 14 Drawing Sheets

POWER CONVERTER

TECHNICAL FIELD

The present disclosure relates to a power converter.

BACKGROUND OF THE DISCLOSURE

In recent years, vehicles provided with a motor as a drive source for propelling the vehicles have increased. Such vehicles carry a high-voltage battery for supplying electric power to the motor. In addition, the vehicles also carry a power converter for converting direct current (DC) power supplied from the battery into alternating current (AC) power.

The power converter, the motor, and the battery form an electric power supply passage therebetween by connecting connectors connected to wiring extending from the motor and the battery to a connector of the power converter. JP5455887B2 discloses a power converter having the connector for electric connection with the motor.

This connector is fixed to one of side walls of a case, and has three plugs provided so as to project outside the case. When seeing the connector from outside in the normal direction of the one side wall to which the connector is fixed, the center of the plug is disposed annularly.

Meanwhile, three busbars (a U-phase busbar, a V-phase busbar, and a W-phase busbar) which electrically connect the connector to a power module are routed so that each busbar extends toward the connector from the inside of the case. The three busbars are routed so that they are parallel to each other in the depth direction of the case at the same height, and they are separated in the width direction of the one side wall.

Meanwhile, for power converters adopted in various applications, a reduction in the appearance size is demanded, regardless of the power converter being a vehicle-mounted type or not. Thus, by reducing the appearance size of the power converter, the occupancy space of the overall device can be narrowed, and spaces can be used effectively.

However, in the power converter according to the conventional technology, it is difficult to compactly dispose the three busbars connected to the connector. That is, it is necessary to secure large gaps between the busbars in consideration of the connecting work of the busbars to the connector. If narrowing the gaps between the busbars while adopting the conventional routing of the busbars, it is necessary to divide each busbar in the longitudinal direction into elements, connect an element of each busbar to the connector, and then connect each element to the remaining elements. Thus, if adopting this configuration, the connecting work becomes complicated and the number of components increases. Therefore, it is difficult to actually adopt this solution.

Note that although the connector related to input/output of AC power to/from the power converter is described as one example, the same problem may arise also in connectors related to input/output of DC power.

SUMMARY OF THE DISCLOSURE

The present disclosure is made in view of the problem described above, and one purpose thereof is to provide a power converter capable of reducing an appearance size, while securing workability in association with connection between a connector and busbars.

A power converter according to one aspect of the present disclosure includes a power module part and a connector part. The power module part has n power modules, n being an integer of 2 or more. The connector part has n busbars connected to the n power modules, respectively, and a connector connected to the n busbars and to be connected with an external apparatus.

In the power converter according to this aspect, each of the n busbars has a connecting part connected to the connector, a module-side connecting part connected to a respective one of the n power modules, and a coupling part continuously coupling the connecting part to the module-side connecting part. The n power modules include a first power module and a second power module that are lined up in a first direction. The connector has n connection points connected with the connecting parts of the n busbars, respectively, the n connection points being disposed in a plane intersecting with the first direction.

In the power converter according to this aspect, the busbar connected to the first power module is a first busbar, the connecting part of the first busbar is a first connecting part, the coupling part of the first busbar is a first coupling part, the busbar connected to the second power module is a second busbar, the connecting part of the second busbar is a second connecting part, the coupling part of the second busbar is a second coupling part, one of the n connection points to which the first connecting part is connected is a first connection point, and another of the n connection points to which the second connecting part is connected is a second connection point. The first connection point and the second connection point are offset in a second direction intersecting with the first direction, and the first connection point is disposed closer to the power module part than the second connection point in the second direction. The second coupling part has a length longer than the first coupling part, and the second coupling part is routed so as to bypass outside of an area of the connector where the n connection points are disposed, when seen in the first direction.

In the power converter according to this aspect, since the second coupling part of the second busbar is routed so that it bypasses outside the area where the connection points of the connector are disposed (hereinafter, referred to as the "connection area"), the workability in association with the connection of the busbars to the connector can be secured, while reducing the device size rather than the routing of the busbars disclosed in JP5455887B2. That is, in the power converter of this aspect, even if a gap between the module-side connecting parts of the first and second busbars and a gap between the coupling parts are narrowed, it becomes easier for an operator to at least access the first and second busbars when connecting the first and second busbars to the connector by routing the first and second busbars so that the second coupling part bypasses outside the connection area. Therefore, in the power converter of this aspect, the appearance size can be reduced, while securing the workability in association with the connection of the busbars to the connector.

In the power converter according to this aspect, the connector part may be an AC connector part configured to perform input and output of three-phase AC power to and from the external apparatus (here, the n is 3). The power module part may include a third power module further lined up with the first power module and the second power module in the first direction.

In the power converter according to this aspect, the busbar connected to the third power module is a third busbar, the connecting part of the third busbar is a third connecting part, the coupling part of the third busbar is a third coupling part, and one of the n connection points to which the third connecting part is connected is a third connection point. The first connection point, the second connection point, and the third connection point may be disposed annularly, when seen in a plan view in the first direction. The third coupling part may have a length longer than the first coupling part, and the third coupling part may be routed so as to bypass outside of the area of the connector where the n connection points are disposed, when seen in the plan view in the first direction.

In the power converter according to this aspect, since the AC connector part has the three busbars, and the busbars are routed so that the coupling part of the third busbar also bypasses outside the connection area, the high workability in association with the connection of the busbars to the connector can be secured, even if gaps between the coupling part of the third busbar and the coupling parts of other busbars (the first and second busbars) are narrowed.

In the power converter according to this aspect, the first coupling part, the second coupling part, and the third coupling part may be routed so that the first coupling part and the third coupling part oppose each other at a first spot, while the second coupling part does not oppose the first coupling part and the third coupling part at the first spot, and the second coupling part and the third coupling part oppose each other at a second spot, while the first coupling part does not oppose the second coupling part and the third coupling part at the second spot.

In the power converter according to this aspect, in the part where the first coupling part and the third coupling part oppose each other (the first spot), the second coupling part is separated therefrom, and in the part where the second coupling part and the third coupling part oppose each other (the second spot), the first coupling part is separated therefrom. Therefore, the size of the area where the busbars are routed can be reduced as compared with a case where the coupling parts of all the three busbars oppose each other.

The power converter according to this aspect may further include a case including a case body having an opening on one side in a third direction intersecting with both the first direction and the second direction, and accommodating the power module part and the connector part, and a lid configured to close the opening of the case body. The second coupling part and the third coupling part may be routed so as to bypass the n connection points of the connector, on the opposite side from the one side in the third direction.

In the power converter according to this aspect, since the second coupling part and the third coupling part are routed so as to bypass on the opposite side from the side of the opening of the case (the one side) with respect to the connection area, the operator can access the connection area from the opening of the case body when connecting the busbars to the connector. Therefore, the high workability for connecting the busbars to the connector can be secured, while enabling the reduction in the appearance size of the device.

In the power converter according to this aspect, the power converter and the external apparatus may be mounted on a vehicle. In this case, the one side in the third direction may be upward of the vehicle.

In the power converter according to this aspect, since the case body opens upwardly, the operator can access the connection area easily from above of the vehicle when connecting the busbars to the connector. Therefore, it is advantageous for securing the high workability.

In the power converter according to this aspect, the second connection point may be disposed on an input side of an impact load expected in the vehicle, from the first connection point and the third connection point. In this case, the second coupling part may have a part adjacent to the second connecting part, the part extending in the up-and-down direction of the vehicle and being separated from the first coupling part and the third coupling part.

In the power converter according to this aspect, since the second coupling part of the second busbar has the part extending in the up-and-down direction (hereinafter, referred to as the "vertically extending part") at the part separated from the first coupling part and the third coupling part, the vertically extending part of the second coupling part deforms independently, if an impact load is applied to the vehicle. For this reason, in the power converter of this aspect, part of the impact load can be absorbed by the deformation of the second coupling part, thereby suppressing short circuits of other busbars and action of the impact load on the power module part. Therefore, in the power converter of this aspect, it is advantageous to secure the high safety of the vehicle carrying the power converter.

In the power converter according to this aspect, the external apparatus may be a motor for propelling the vehicle, and have a motor housing serving as an outer cell. A transmission having an axle housing serving as an outer cell may also be mounted on the vehicle, and may be disposed adjacent to the external apparatus. The case of the power converter may be disposed on a housing of at least one of the motor housing and the axle housing so that a part of the case where the connector part is accommodated is located on the input side of the impact load, from a part of the case where the power module part is accommodated. Further, in such routing, an end of the case on the input side of the impact load may be flush with the motor housing or the axle housing, or may be located on the opposite side from the input side, compared to the motor housing or the axle housing.

In the power converter according to this aspect, the part of the case accommodating the connector part (hereinafter, referred to as the "connector accommodating part") is disposed so that it is located on the input side of the impact load, and the end of the case on the connector accommodating part side is disposed so that it becomes flush with the motor housing or the axle housing, or is located on the opposite side from the end, compared to the motor housing or the axle housing. Thus, the impact load will not be intensively inputted into the end of the case of the power converter even if the impact load is applied, thereby securing the high safety.

In the power converter according to this aspect, the n busbars may be molded by insulating material so that the coupling parts become integral.

In the power converter according to this aspect, since the coupling parts of all the busbars are molded integrally by the insulating material, the n busbars can be handled as one component. Therefore, the high workability can be secured when assembling the power converter, as compared with a case where the n busbars are handled independently.

DETAILED DESCRIPTION OF THE DISCLOSURE

Hereinafter, several embodiments of the present disclosure will be described with reference to the accompanying drawings. Note that the following embodiments illustrate the present disclosure exemplarily, and therefore, the present disclosure is not limited in any ways by the embodiments, except for its essential configuration.

First Embodiment

1. Configuration of Vehicle V

A configuration of a vehicle V to which a power converter 100 according to a first embodiment of the present disclosure is mounted is described with reference to FIG. 1. Note that, below, a front-and-rear direction of the vehicle V is simply described as the "front-and-rear direction," a left-and-right direction of the vehicle V (vehicle width direction) is simply described as the "left-and-right direction," and an up-and-down direction of the vehicle V is simply described as the "up-and-down direction."

Figure 1:
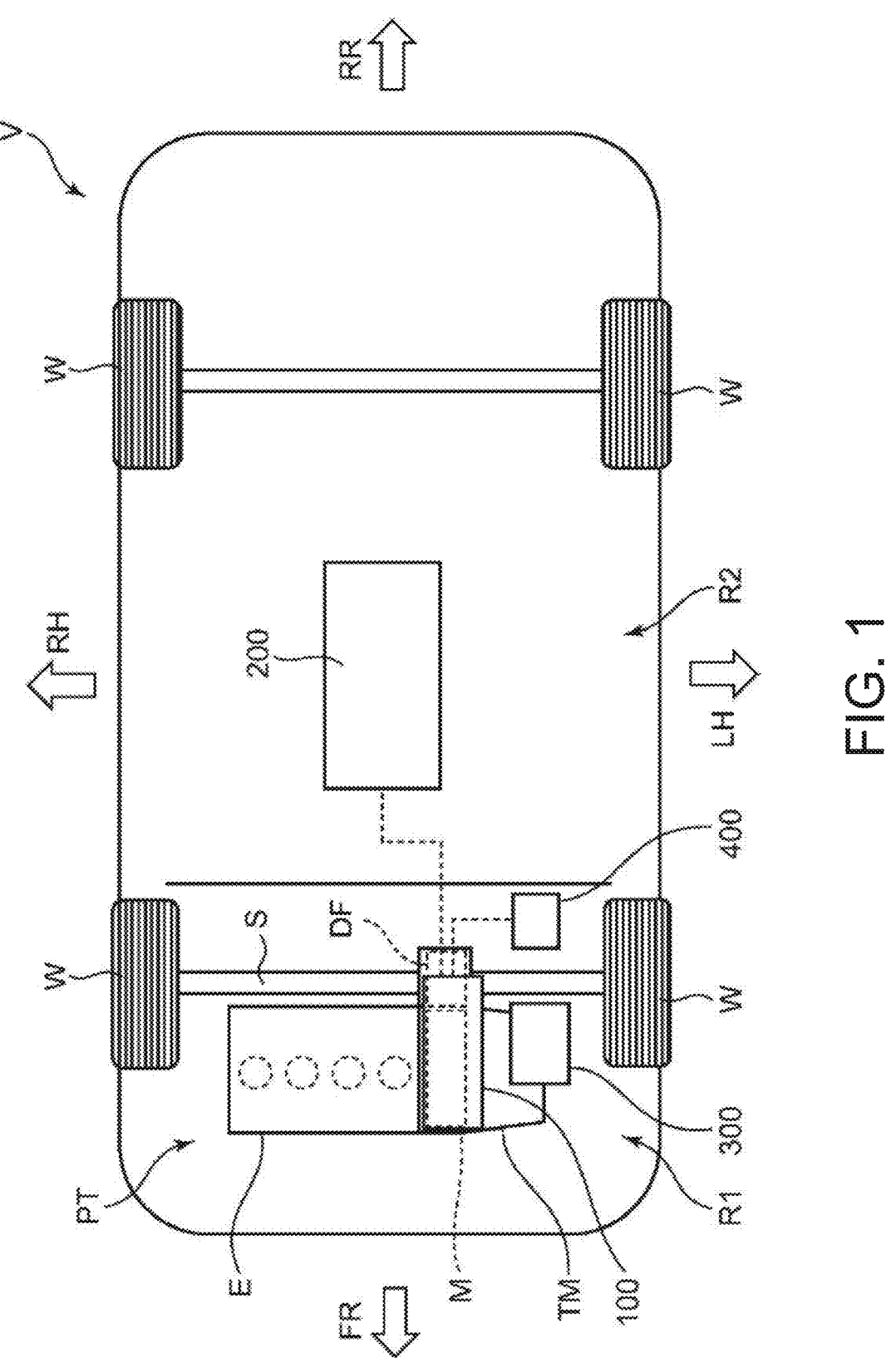
FIG. 1 is a schematic diagram illustrating a configuration of a vehicle provided with a power converter according to a first embodiment of the present disclosure.

As illustrated in FIG. 1, the vehicle V carries a powertrain PT, the power converter 100, a high-voltage battery 200, and a low-voltage battery 300.

The vehicle V is a so-called "Hybrid Electric Vehicle (HEV)," which carries an engine E and a motor M which function as a drive source for propelling (i.e., a drive source of the vehicle V (wheels W)). The powertrain PT includes the engine E and the motor M. The powertrain PT also includes a transmission TM and a differential gear DF.

The motor M is a three-phase three-wire alternating current (AC) motor which rotates in response to supply of three-phase AC power, and includes an output shaft, a rotor having permanent magnets arranged around the output shaft, and a stator which is disposed radially outward of the rotor and where coils are wound around a plurality of teeth. The plurality of coils are comprised of a U-phase coil, and a V-phase coil, and a W-phase coil, and currents of different phases are supplied to the coils.

The transmission TM is connected with the motor M, and reduces the speed of rotation (changes the gear stage) inputted from the motor M and outputs the reduced rotation. The differential gear DF transmits the rotation outputted from the transmission TM to the wheels W via a drive shaft S.

In this embodiment, the vehicle V is a parallel-type hybrid electric vehicle as one example, which is propelled by the motor M, by the engine E, or by both the motor M and the engine E. Note that the vehicle V is capable of performing regenerative deceleration so that the motor M generates electric power by a transferring force from the wheels W when the vehicle V decelerates.

The high-voltage battery 200 is a battery which supplies and receives electric power to/from the motor M. When the motor M is used as the propelling drive source, the high-voltage battery 200 supplies electric power to the motor M. On the other hand, when the motor M is used as a generator when the vehicle V decelerates, the high-voltage battery 200 stores electric power generated by the motor M.

The power converter 100 is an inverter device connected to the three-phase three-wire system motor M, and converts direct current (DC) power from the high-voltage battery 200 into AC power, and then supplies it to the motor M. In detail, the power converter 100 converts DC power into three-phase AC power.

Further, when the motor M is used as a generator when the vehicle V decelerates, the power converter 100 converts the AC power generated by the motor M into DC power, and then supplies it to the high-voltage battery 200.

The low-voltage battery 300 is a battery for supplying electric power to electrical components provided to each part of the vehicle V. The low-voltage battery 300 is a battery which is lower in the nominal voltage than the high-voltage battery 200.

For example, the high-voltage battery 200 is a lithium-ion battery or a nickel-hydrogen battery of which the nominal voltage is 24V or higher, and the low-voltage battery 300 is a lead battery or a lithium-ion battery of which the nominal voltage is 12V or 24V.

In this embodiment, the powertrain PT, the power converter 100, and the low-voltage battery 300 are accommodated in a powertrain room R1 formed in a front part of the vehicle V. The high-voltage battery 200 is mounted under a floor of a cabin R2 formed behind the powertrain room R1.

Note that a PCM (Powertrain Control Module) 400 which is a controller for totally controlling the powertrain PT including the motor M and the engine E is also mounted on the vehicle V.

2. Layout of Power Converter 100

Figure 2:
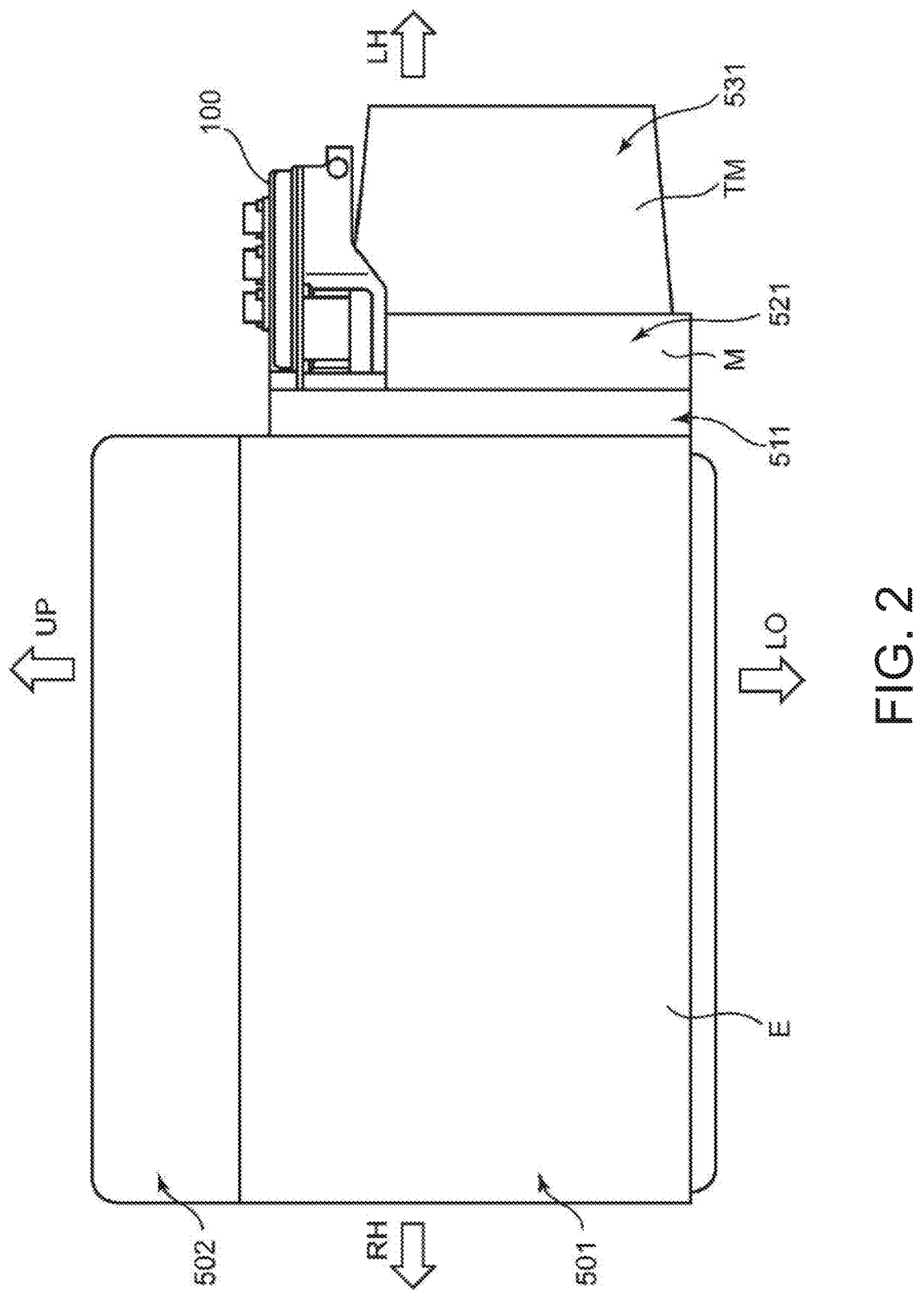
FIG. 2 is a front view illustrating a layout of the power converter.
Figure 3:
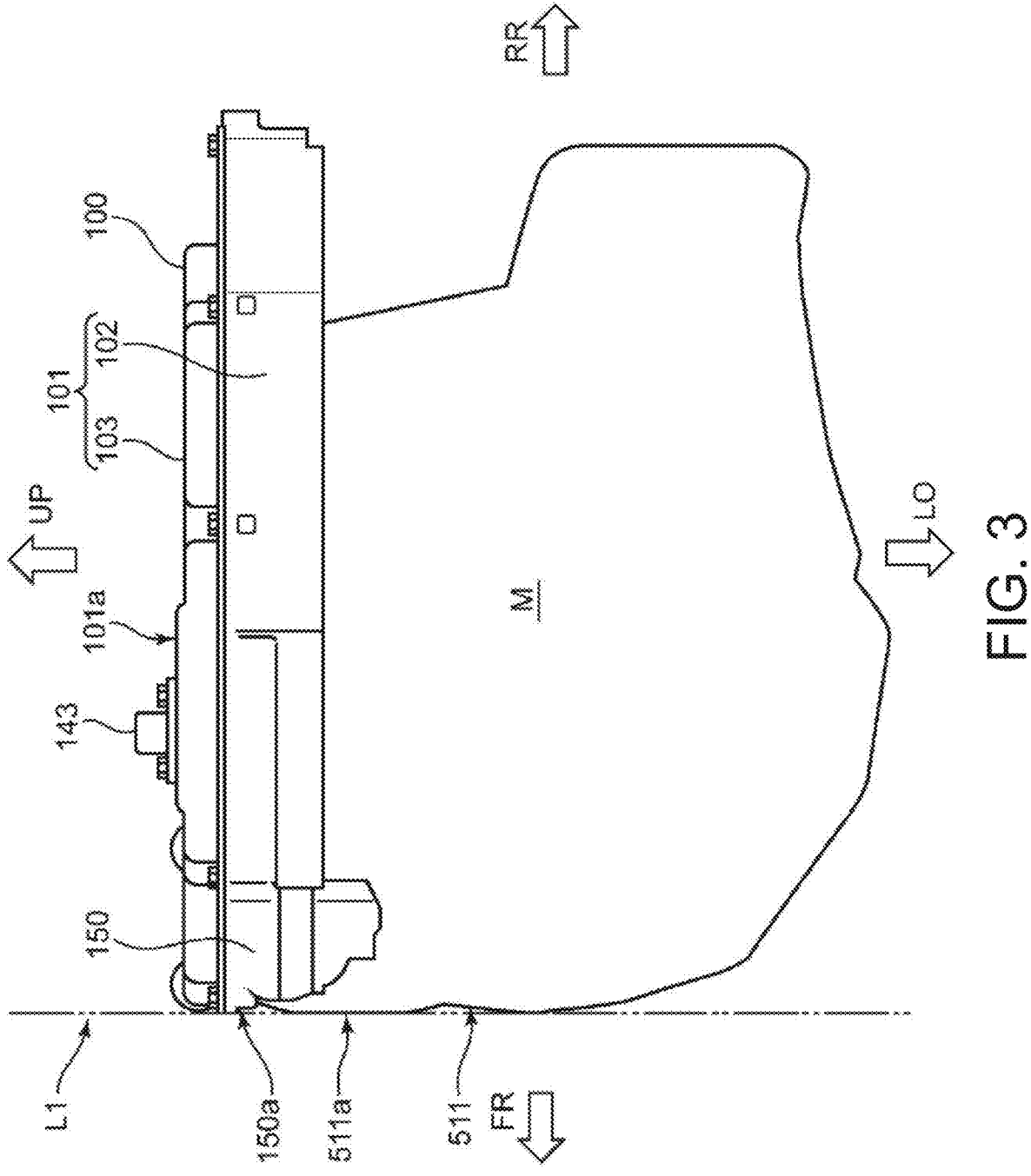
FIG. 3 is a side view illustrating the layout of the power converter.

The layout of the power converter 100 in the powertrain room R1 is described with reference to FIGS. 2 and 3. FIG. 2 is a front view of the power converter 100 and its peripheral equipment, when seen from the front side of the vehicle V. FIG. 3 is a side view of the power converter 100 and the motor M, when seen from the left side of the vehicle V. Note that FIGS. 2 and 3 omit illustration of the low-voltage battery 300.

As illustrated in FIG. 2, in the powertrain room R1, the engine E, the motor M, and the transmission TM are disposed in this order from the right side. The engine E includes an engine lower part 501 and an engine upper part 502 disposed above the engine lower part 501. The motor M is disposed adjacent to the engine lower part 501 of the engine E on the left side.

The motor M includes a first motor housing 511 and a second motor housing 521 as outer cells. The first motor housing 511 is joined to a left-side external surface of the engine lower part 501, and the second motor housing 521 is connected to the left side of the first motor housing 511 without a gap.

The transmission TM has an axle housing 531 as an outer cell. The axle housing 531 has a frustum shape of which the cross-sectional size is reduced gradually from the right side toward the left side.

The power converter 100 is disposed above the second motor housing 521 and the axle housing 531, in the left-and-right direction of the vehicle V.

The power converter 100 has an AC connector part 150 in a front part of the vehicle V. The AC connector part 150 has busbars and a connector therein for connection with the motor M, and a lower surface of a case (housing) is located below other parts of the power converter 100. Note that, in this embodiment, a case 101 is constituted by a combination of a case body (housing body) 102 having an upward opening, and a lid 103 which closes the opening of the case body 102.

Here, when drawing an imaginary line L1 which contacts a front end part 511a of the first motor housing 511 of the motor M, and extends in the up-and-down direction, an end part (front end part) 150a of the case 101 of the power converter 100, where the AC connector part 150 is accommodated, is disposed at a position which is substantially along the imaginary line L1. That is, in this embodiment, the power converter 100 is disposed so that the front end part 150a of the AC connector part 150 becomes flush with the front end part 511a of the first motor housing 511.

Note that the power converter 100 has a PCM connector 143 which projects upwardly from an upper surface 101a of the case 101. The PCM 400 (see FIG. 1) is connected to the power converter 100 via the PCM connector 143.

3. Configuration of Power Converter 100

Figure 4:
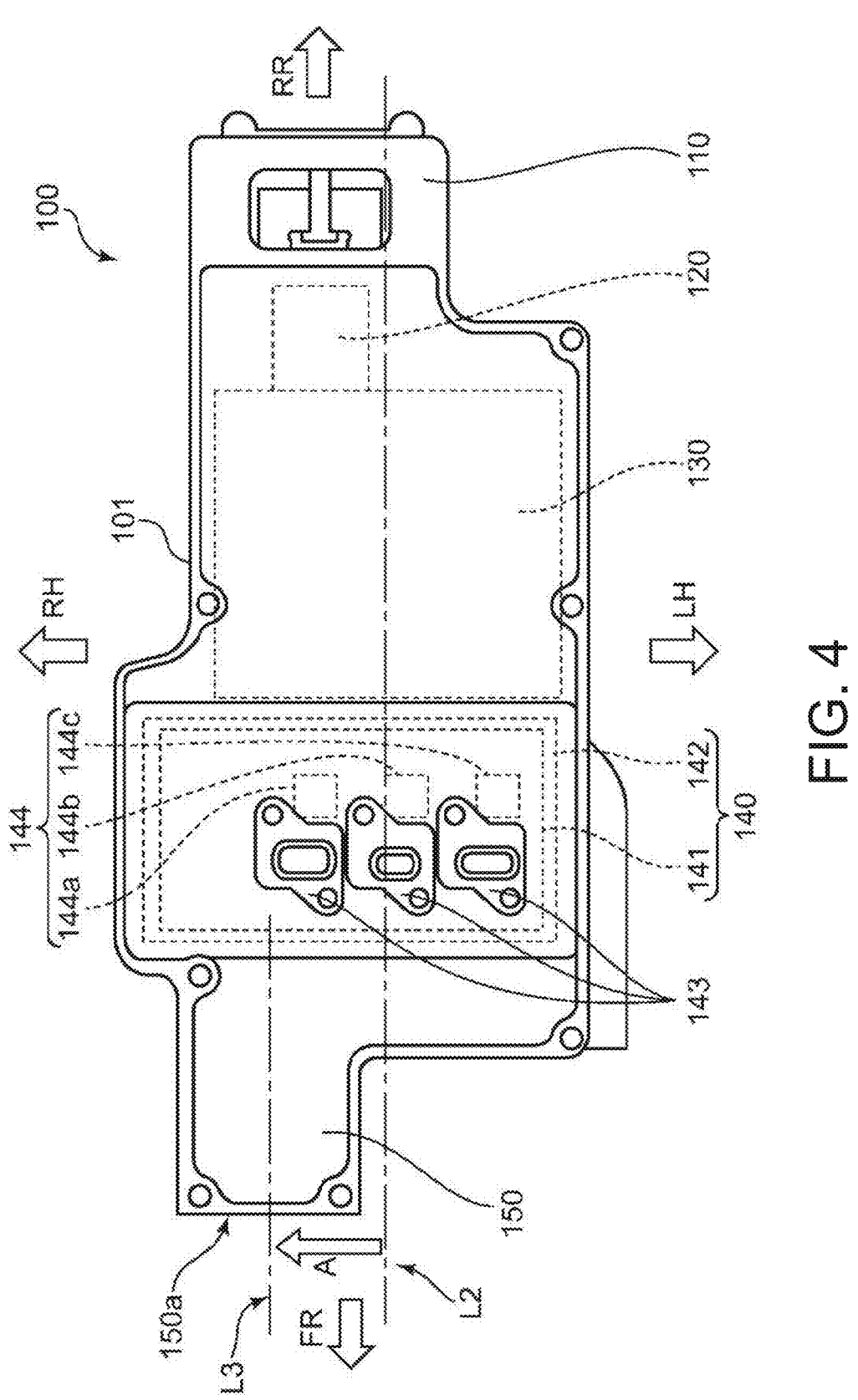
FIG. 4 is a plan view illustrating an appearance configuration of the power converter.

A configuration of the power converter 100 is described with reference to FIG. 4. FIG. 4 is a plan view of the power converter 100, seen from above.

As illustrated in FIG. 4, the power converter 100 includes a DC connector part 110, a noise removing part 120, a smoothing part 130, a power module part 140, and the AC connector part 150, which are accommodated inside the case 101. The DC connector part 110, the noise removing part 120, the smoothing part 130, the power module part 140, and the AC connector part 150 are disposed in this order from the rear side of the vehicle V.

Here, the AC connector part 150 is disposed so that a center line L3 in the left-and-right direction is offset to the right (arrow A) from a center line L2 of other parts of the power converter 100.

The DC connector part 110 has a plurality of terminals used for connection with the high-voltage battery 200. The noise removing part 120 is a functional part for preventing leaking of noise of a high frequency component from the power converter 100, and, for example, it includes a ferrite core. The noise removing part 120 is inserted in an electric power passage between the DC connector part 110 and the smoothing part 130.

The smoothing part 130 is a functional part which smooths DC power, and it includes a smoothing capacitor (e.g., a film capacitor). The smoothing part 130 is inserted in an electric power passage between the noise removing part 120 and the power module part 140.

The power module part 140 includes a module body 141 having three IGBTs (Insulated Gate Bipolar Transistors)

144a-144c which are each examples of a power module, and a controller circuit 142 which electrically controls the IGBTs 144a-144c of the module body 141. Note that the three IGBTs 144a-144c of the module body 141 are lined up in the left-and-right direction (i.e., a first direction).

The PCM connector 143 is connected to the controller circuit 142. A controller formed in the controller circuit 142 controls the IGBTs 144a-144c of the module body 141 in response to a command from the PCM 400, and changes a conversion amount of DC power and AC power. Note that, below, the IGBTs 144a-144c may collectively be referred to as the "IGBT 144."

In the power converter 100, the module body 141 of the power module part 140 is constituted by a combination of electronic components, such as power semiconductors, including the IGBT 144, corresponding to the U-phase, the V-phase, and the W-phase.

The module body part 141 of the power module part 140 is inserted in an electric power passage between the smoothing part 130 and the AC connector part 150.

The AC connector part 150 has a connector and busbars used for electrically connecting with the motor M. The power converter 100 sends out AC power toward the motor M via the AC connector part 150. Further, when the motor M functions as the generator when the vehicle V decelerates, the power converter 100 accepts AC power from the motor M via the AC connector part 150.

When supplying AC power for propelling the vehicle to the motor M, DC power outputted from the high-voltage battery 200 is inputted into the noise removing part 120 via the DC connector part 110. The DC power which passed the noise removing part 120 is smoothed by the smoothing part 130, and is sent out to the power module part 140.

The power module part 140 converts the DC power into three-phase AC power according to a command from the PCM 400. Then, the converted three-phase AC power is sent out to the motor M via the AC connector part 150.

On the contrary, when the motor M functions as the generator when the vehicle V decelerates, the three-phase AC power generated by the motor M is inputted into the power module part 140 via the AC connector part 150. Then, the inputted AC power is converted into DC power by the power module part 140. The converted DC power is sent out to the high-voltage battery 200 via the DC connector part 110 after smoothing by the smoothing part 130 and removal of the noise of a high frequency component by the noise removing part 120. Therefore, the high-voltage battery 200 is charged.

Note that a DC-DC converter (not illustrated) is inserted in an electric power passage between the power converter 100 and the high-voltage battery 200.

4. Connection Structure of Motor M and Power Converter 100, and Internal Structure of AC Connector Part 150

Figure 5:
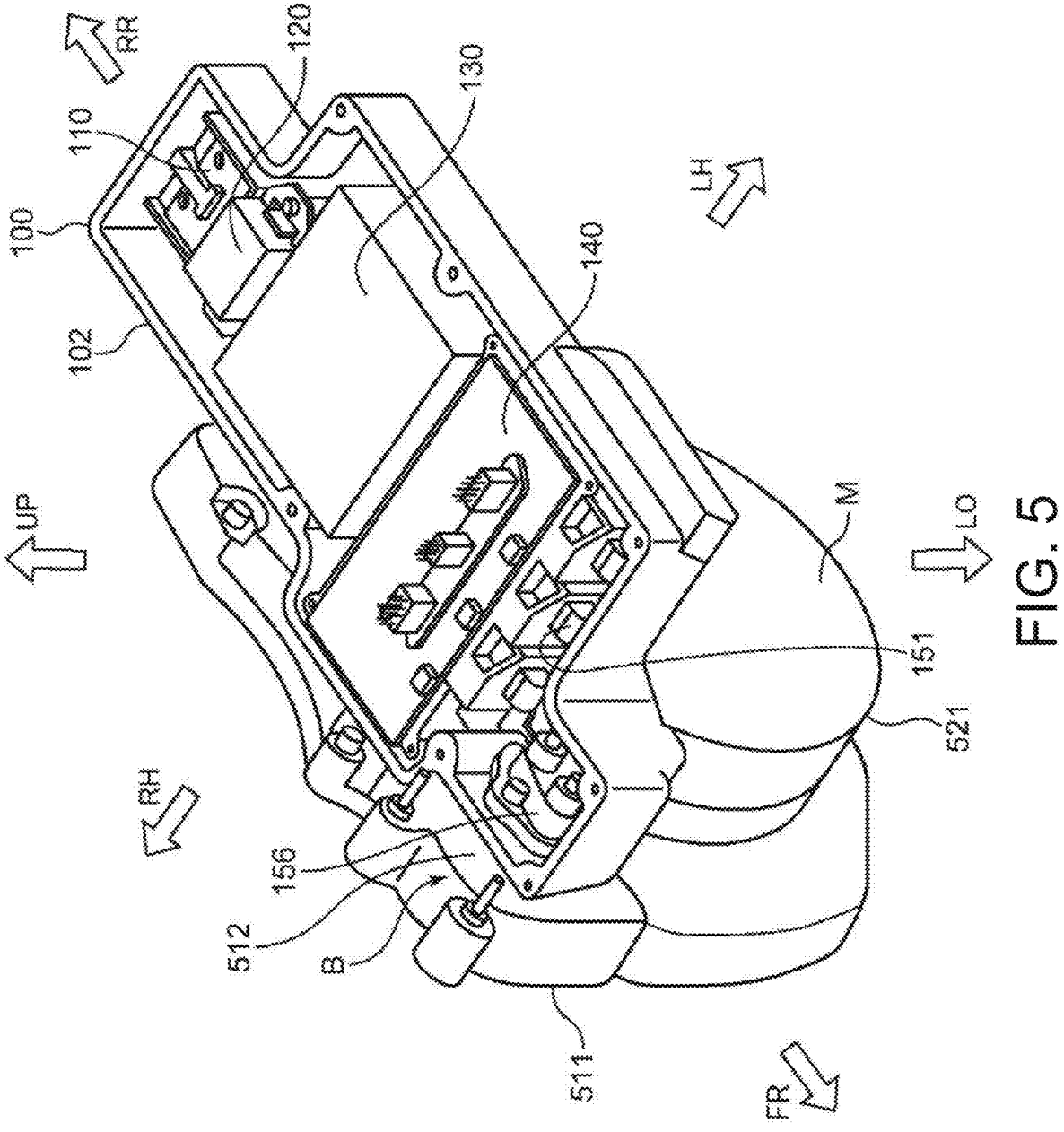
FIG. 5 is a perspective view illustrating an internal configuration of the power converter.
Figure 6:
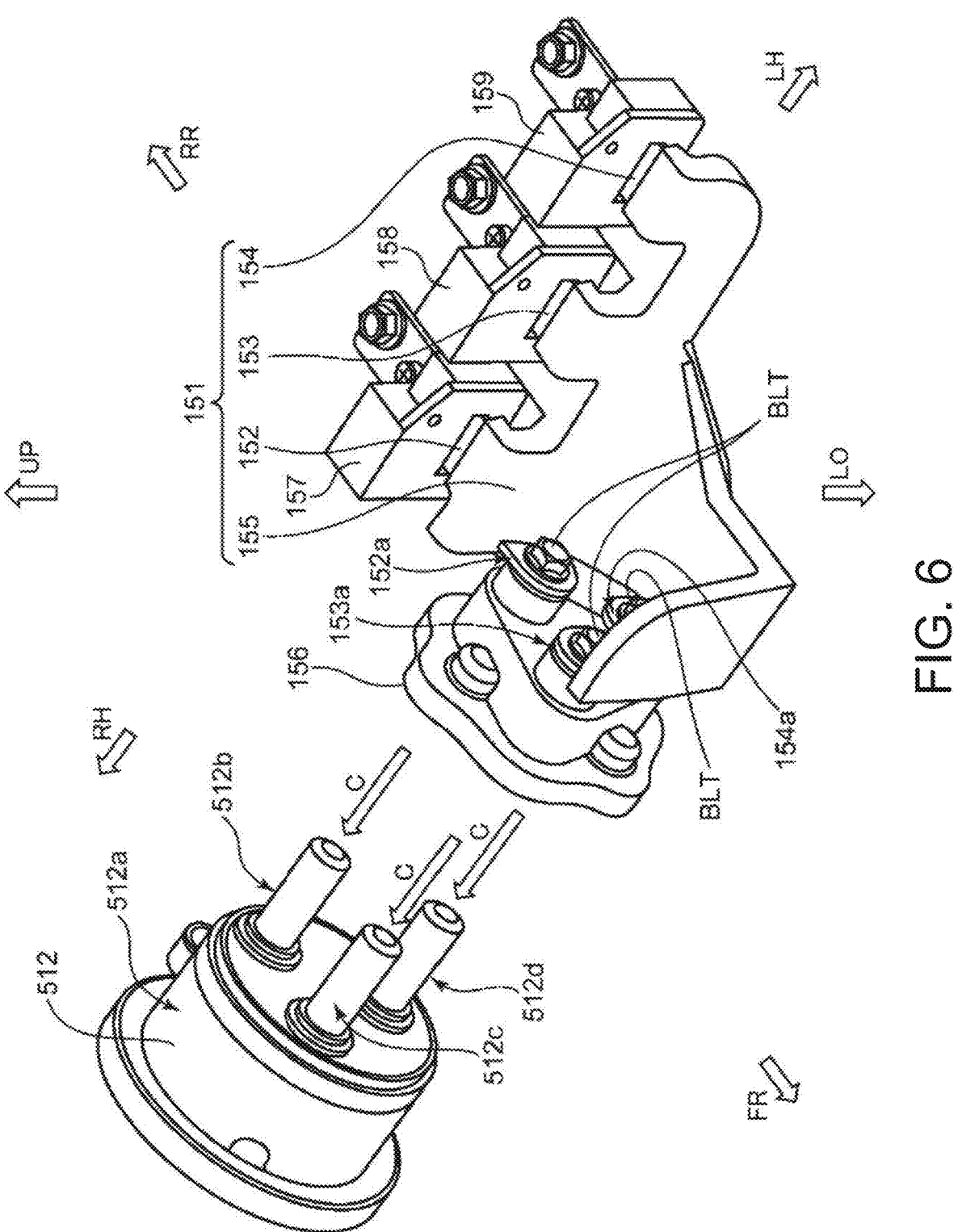
FIG. 6 is a perspective view illustrating a configuration of an AC busbar module and a configuration of a motor-side connector in the power converter.
Figure 7:
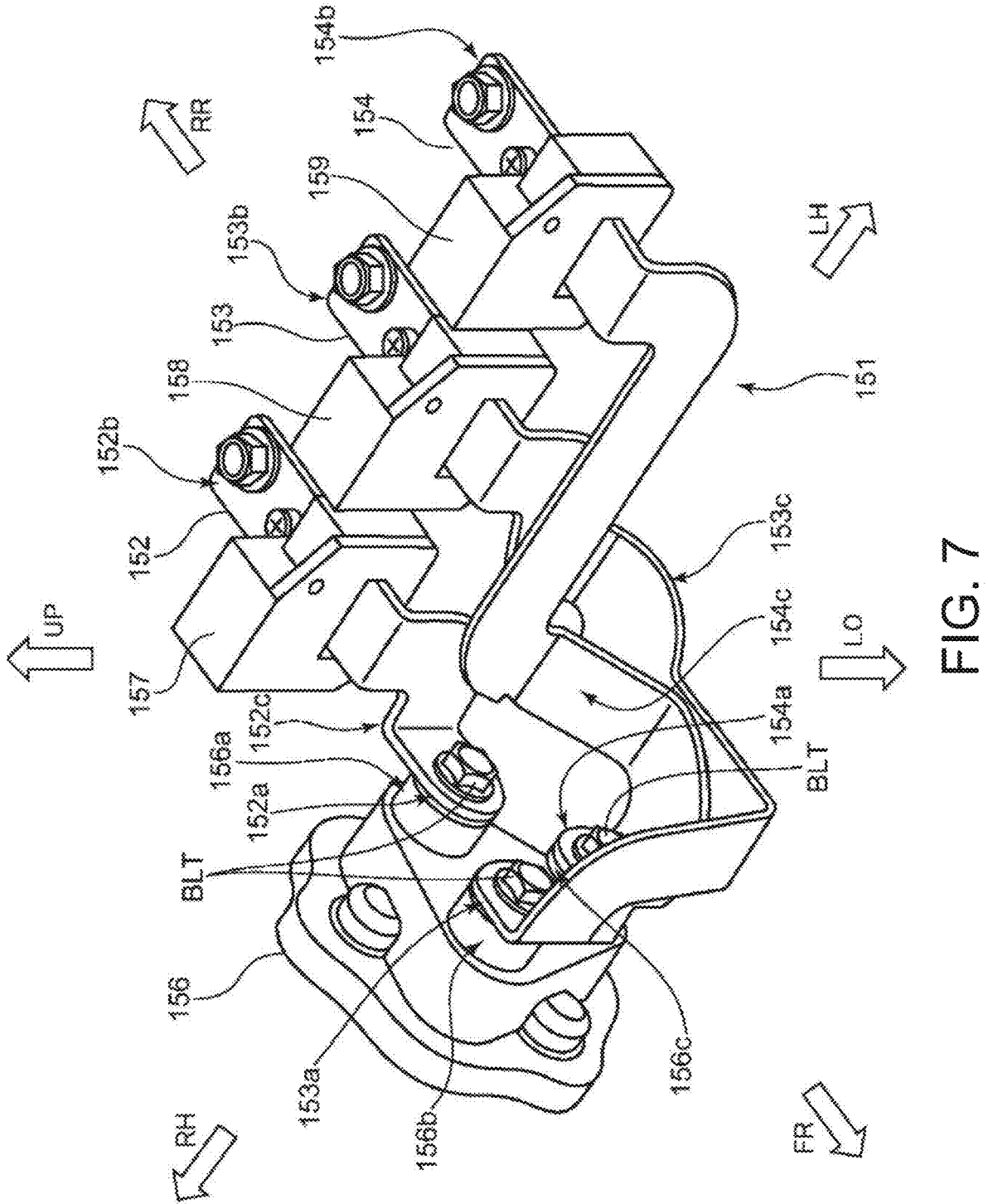
FIG. 7 is a perspective view illustrating the AC busbar module where a resin mold part is omitted.

A connection structure of the motor M and the power converter 100, and an internal structure of the AC connector part 150 will be described with reference to FIGS. 5 to 7. FIG. 5 is a perspective view illustrating the power converter 100 where the lid 103 is removed from the case body 102. FIG. 6 is a perspective view illustrating a partial configuration of a motor-side connector 512 and the AC connector part 150. FIG. 7 is a perspective view illustrating a partial configuration of the AC connector part 150 where a resin mold part 155 is omitted.

As illustrated in FIG. 5, the electric connection between the motor M and the power converter 100 is made by fitting of the motor-side connector 512 into a connector 156 of the AC connector part 150 (arrow B). The motor-side connector 512 is fixed to the first motor housing 511, and a part thereof is inserted into the case body 102 of the case 101. In detail, as illustrated in FIG. 6, the motor-side connector 512 has a pillar-shaped base part 512*a* and three terminals 512*b*-512*d* projected to the left from an end surface of the base part 512*a*.

Note that the terminals 512*b*-512*d* are electrically connected to U-phase, V-phase, and W-phase motor coils of the motor M via wiring (not illustrated).

The motor-side connector 512 is disposed so that a part of the base part 512*a* and the three terminals 512*b*-512*d* are inserted in the case body 102. Inside the case body 102, the terminals 512*b*-512*d* of the motor-side connector 512 are inserted into female terminals (not illustrated) of the connector 156 of the AC connector part 150 (arrows C in FIG. 6) so that the motor-side connector 512 and the connector 156 are electrically connected to each other.

Note that, in this embodiment, as one example, the terminal 512*b* is a U-phase terminal, the terminal 512*c* is a V-phase terminal, and the terminal 512*d* is a W-phase terminal.

As illustrated in FIG. 7, the connector 156 has three connection points 156*a*-156*c* on the opposite side (left side) of the part for accepting the insertion of the terminals 512*b*-512*d* of the motor-side connector 512. Each of the connection points 156*a*-156*c* has a cylindrical shape. The three connection points 156*a*-156*c* are disposed annularly in a plan view in the left-and-right direction. That is, the three connection points 156*a*-156*c* are disposed in a plane defined by the front-and-rear direction and the vertical direction, which intersects with the first direction (left-and-right direction). The plane and the first direction intersect as opposed to the first direction lying in the plane.

As illustrated in FIG. 6, in the AC connector part 150, an AC busbar module 151 is connected to the connector 156 by being fastened with bolts BLT. The AC busbar module 151 has three busbars 152-154 and the resin mold part 155.

As illustrated in FIG. 7, the first busbar 152 includes a first connecting part 152*a* connected with a first connection point 156*a* of the connector 156, a module-side connecting part 152*b* connected with the IGBT 144*a* of the power module part 140, and a first coupling part 152*c* which continuously couples the connecting part 152*a* to the module-side connecting part 152*b*.

The second busbar 153 includes a second connecting part 153*a* connected with the second connection point 156*b* of the connector 156, a module-side connecting part 153*b* connected with the IGBT 144*b* of the power module part 140, and a second coupling part 153*c* which continuously couples the connecting part 153*a* to the module-side connecting part 153*b*.

The third busbar 154 includes a third connecting part 154*a* connected with the third connection point 156*c* of the connector 156, a module-side connecting part 154*b* connected with the IGBT 144*c* of the power module part 140, and a third coupling part 154*c* which continuously couples the connecting part 154*a* to the module-side connecting part 154*b*.

The resin mold part 155 is made of insulating material (e.g., epoxy resin), and it is formed so that it covers outer circumferential parts of the busbars 152-154 and is filled in the gaps between the busbars 152-154. Therefore, the AC busbar module 151 is handled as one component when assembling the power converter 100.

In this embodiment, the busbar 152 is a U-phase busbar, the busbar 153 is a V-phase busbar, and the busbar 154 is a W-phase busbar.

5. Routing Structure of Coupling Parts 152*c*, 153*c*, and 154*c* in Busbars 152-154

Figure 8:
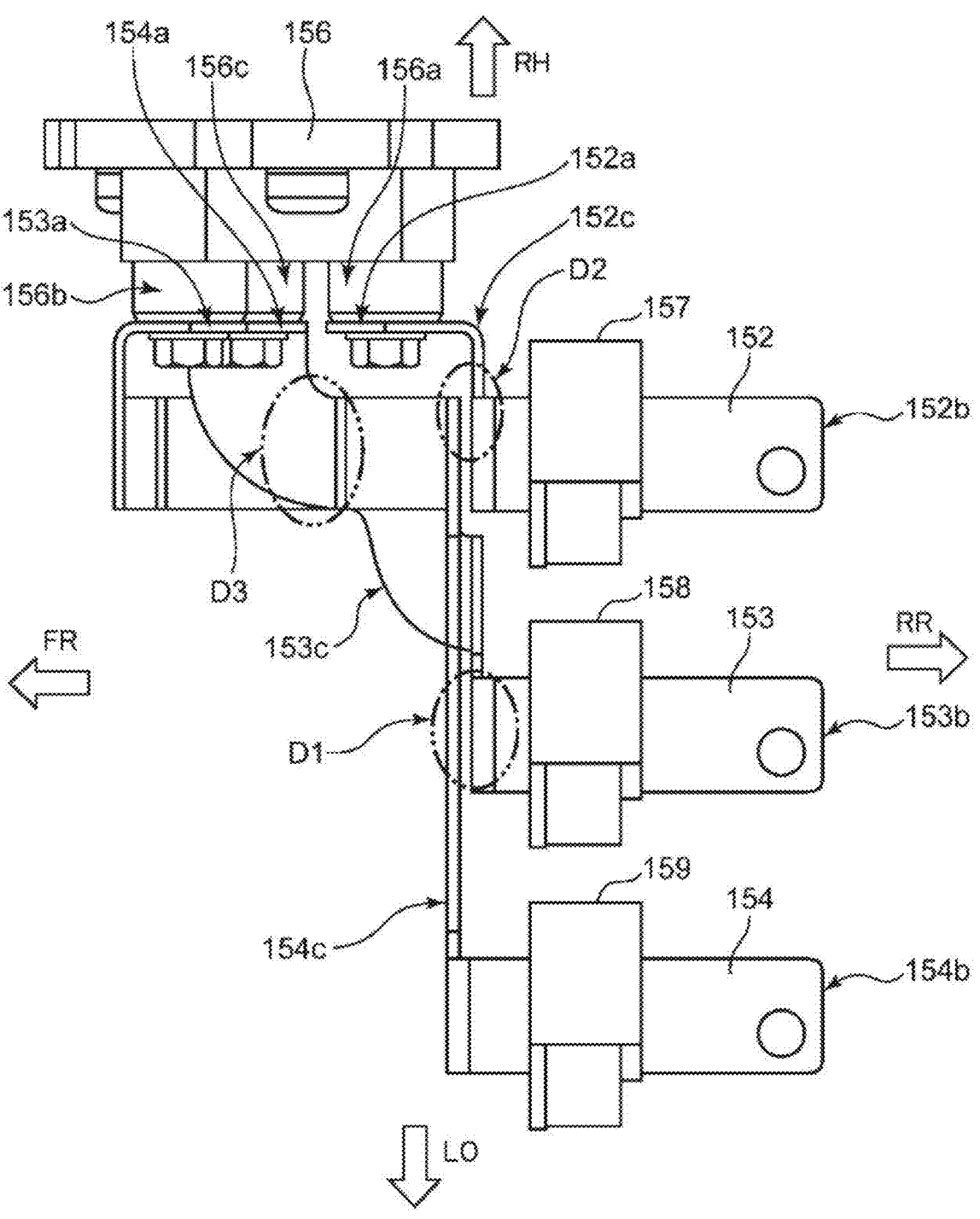
FIG. 8 is a plan view illustrating routing of coupling parts of busbars.
Figure 9:
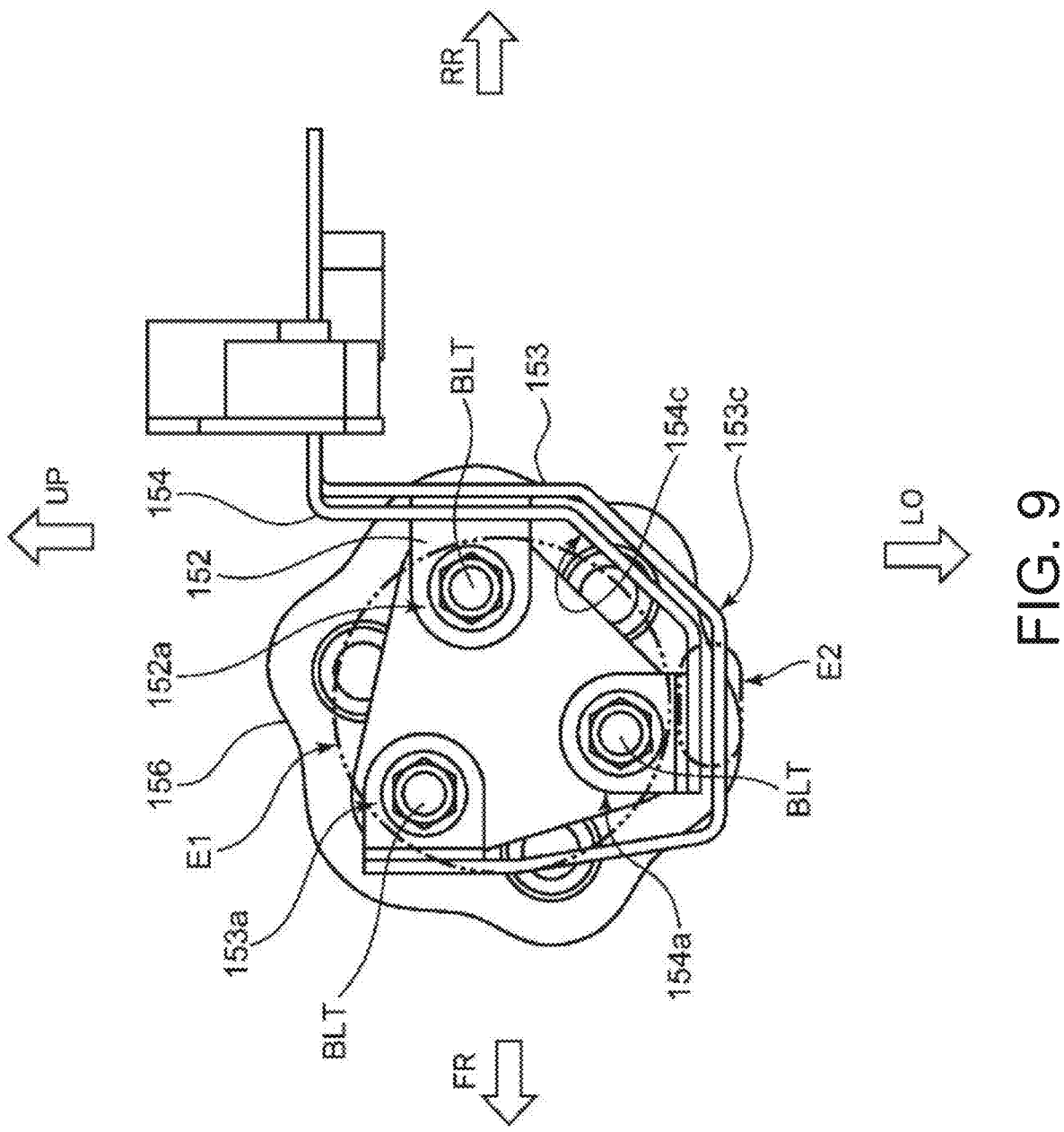
FIG. 9 is a side view illustrating the routing of the coupling parts of the busbars.
Figure 10:
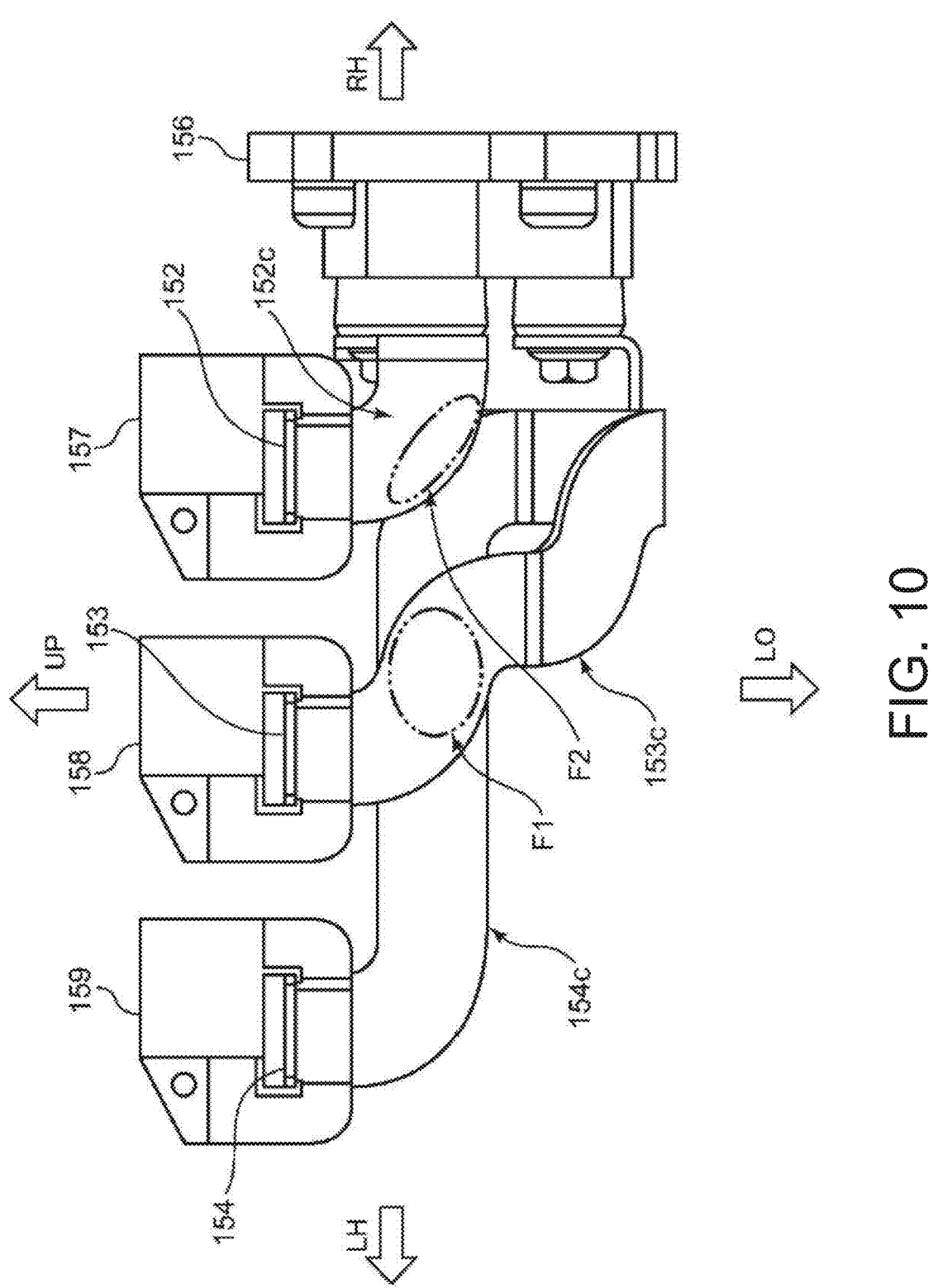
FIG. 10 is a rear view illustrating the routing of the coupling parts of the busbars.

A routing structure of the coupling parts 152*c*, 153*c*, and 154*c* in the busbars 152-154 is described with reference to FIGS. 8 to 10. FIG. 8 is a plan view illustrating the busbars 152-154, when seen from above. FIG. 9 is a side view illustrating the busbars 152-154 and the connector 156, when seen from the left. FIG. 10 is a rear view illustrating the busbars 152-154, when seen from the rear.

As illustrated in FIG. 8, in the connector 156, the connection point 156*a* is offset from the connection points 156*b* and 156*c* in the front-and-rear direction (i.e., a second direction intersecting with the first direction). Since the power module part 140 is located rearward of the connector 156 (see FIG. 5), the first connection point 156*a* is disposed closer to the power module part 140 and the second connection point 156*b* is disposed farther from the power module part 140, in the second direction. In detail, the connection point 156*a* is disposed rearward of the connection points 156*b* and 156*c* (toward the power module part 140). Note that, in this embodiment, the connection point 156*c* is disposed rearward of the connection point 156*b*. In other words, the connecting part 152*a* of the busbar 152 is offset rearwardly of the connecting parts 153*a* and 154*a* of the busbars 153 and 154, respectively. Note that the connection points 156*a*-156*c* of the connector 156 are disposed annularly in a plan view in the left-and-right direction.

As can be seen from FIGS. 7 to 10, the coupling part 152*c* is the shortest of the three and the coupling part 154*c* is the longest. Thus, the coupling part 153*c* has a length longer than the coupling part 152*c*, where the length is measured along the center of a three-dimensional route over which the coupling part 153*c* extends from the connecting part 153*a* to the module-side connecting part 153*b*. Similarly, the coupling part 154*c* also has a length longer than the coupling part 152*c*.

The coupling parts 152*c*, 153*c*, and 154*c* of the busbars 152-154 have parts which extend linearly in the front-and-rear direction and are parallel to each other adjacent to the module-side connecting parts 152*b*, 153*b*, and 154*b*, respectively. In this embodiment, current sensors 157-159 are attached to the parts of the busbars 152-154 which extend linearly, respectively. The current sensors 157-159 are sensors which detect values of current flowing through busbars 152-154, although the detailed explanation is omitted because they are known sensors.

As illustrated in FIGS. 9 and 10, the coupling parts 152*c*, 153*c*, and 154*c* of the busbars 152-154 are bent downwardly at front ends of the parts which extend linearly in the front-and-rear direction. The coupling part 152*c* of the busbar 152 extends rightwardly from the downwardly-extending part, further extends forwardly, and is coupled to the connecting part 152*a*.

The coupling part 153*c* of the busbar 153 extends rightwardly from the downwardly-extending part, further extends downwardly, forwardly, upwardly, and then rightwardly, and is coupled to the connecting part 153*a*. Here, as illustrated in FIG. 9, in the busbar 153, the coupling part 153*c* is coupled to the connecting part 153*a* from the front. Further, the busbar 153 is routed so that the coupling part 153*c* of the busbar 153 does not cross an area (E1 area in FIG. 9) where the three connection points 156*a*-156*c* (see FIG. 7) of the connector 156 are disposed. That is, the coupling part 153*c* of the busbar 153 does not cross in the front-and-rear direction the area (E1 area) where the three connection points 156a-156c of the connector 156 are disposed, but it is routed to bypass below the area, around the outer circumference of this area.

Although the coupling part 153c of the busbar 153 is routed so that the vicinity of the coupling part to the connecting part 153a extends in the up-and-down direction, this part is disposed so that the coupling parts 152c and 154c of the busbars 152 and 154 do not come close to this part.

The coupling part 154c of the busbar 154 extends rightwardly from the downwardly-extending part, further extends downwardly and then rightwardly, and is coupled to the connecting part 154a. As illustrated in FIG. 9, in the busbar 154, the coupling part 154c is coupled to the connecting part 154a from below. The busbar 154 is routed so that the coupling part 154c of the busbar 154 does not cross the above-described area of the connector 156. That is, the coupling part 154c of the busbar 154 does not cross the area (E1 area), but it is routed so as to bypass below the outer circumference of this area.

Further, in the AC connector part 150 of this embodiment, the coupling parts 152c, 153c, and 154c of the three busbars 152-154 are routed so that only two of the busbars 152-154 overlap with each other in a part where the coupling parts 152c, 153c, and 154c overlap with each other (a part where the principal surfaces oppose each other). In detail, the coupling part 152c of the busbar 152 and the coupling part 153c of the busbar 153 are routed so that the principal surfaces do not oppose each other.

Although the coupling part 152c of the busbar 152 and the coupling part 154c of the busbar 154 oppose each other at D2 part in FIG. 8 and F2 part in FIG. 10, they are routed so that these opposing parts are separated from the coupling part 153c of the busbar 153. Similarly, although the coupling part 153c of the busbar 153 and the coupling part 154c of the busbar 154 oppose each other at D1 and D3 parts in FIG. 8, E2 part in FIG. 9, and F1 part in FIG. 10, they are routed so that these opposing parts are separated from the coupling part 152c of the busbar 152.

Since the coupling parts 152c, 153c, and 154c of the busbars 152-154 are routed so that two coupling parts overlap with each other at most as described above, the thickness of the overlapping part (the part where the principal surfaces oppose each other) can be reduced as compared with a case where the coupling parts 152c, 153c, and 154c of all the three busbars 152-154 overlap with each other.

6. Effects

Since in the power converter 100 according to this embodiment the coupling part 153c of the busbar 153 is routed so that it bypasses the outer circumference of this area (E1 area in FIG. 9) where the connection points 156a-156c of the connector 156 are disposed, the workability in association with the connection of the busbars 152-154 to the connector 156 can be secured, while reducing the device size rather than the routing of the busbars disclosed in JP5455887B2. That is, in the power converter 100, even if the gap between the module-side connecting parts 152a and 153a of the busbars 152 and 153, and the gap between the coupling parts 152c and 153c are narrowed, it becomes easier for an operator to at least access the busbars 152 and 153 when connecting the busbars 152 and 153 to the connector 156 by routing the busbars 152 and 153 so that the coupling part 153c bypasses the outer circumference of the E1 area. Therefore, in the power converter 100, the appearance size can be reduced, while securing the workability in association with the connection of the busbars 152-154 to the connector 156.

Further, in the power converter 100 according to this embodiment, since the AC connector part 150 has the three busbars 152-154, and the busbars 152-154 are routed so that the coupling part 154c of the busbar 154 also bypasses the outer circumference of this area E1, the high workability in association with the connection of the busbars 152-154 to the connector 156 can be secured, even if the gaps between the busbars 154 and the coupling parts 152c and 153c of other busbars 152 and 153 are narrowed.

Further, in the power converter 100 according to this embodiment, in the part where the coupling part 152c of the busbar 152 and the coupling part 154c of the busbar 154 oppose each other, the coupling part 153c of the busbar 153 is separated therefrom (it does not oppose any of those), and in the part where the coupling part 153c of the busbar 153 and the coupling part 154c of the busbar 154 oppose each other, the coupling part 152c of the busbar 152 is separated therefrom (it does not oppose any of those). Therefore, the size of the AC busbar module 151 can be reduced as compared with the case where the coupling parts 152c, 153c, and 154c of all the three busbars 152-154 oppose each other.

Further, in the power converter 100 according to this embodiment, since the coupling part 153c of the busbar 153 and the coupling part 154c of the busbar 154 are routed so as to bypass below the E1 area (on the opposite side of the opening of the case body 102), the operator can access the E1 area easily from the opening of the case body 102 when connecting the busbars 152-154 to the connector 156. Therefore, the high workability for connecting the busbars 152-154 to the connector 156 can be secured, while enabling the reduction in the appearance size of the device 100.

Further, in the power converter 100 according to this embodiment, since the case body 102 opens upwardly, the operator can access the E1 area easily from above of the vehicle V when connecting the busbars 152-154 to the connector 156. Therefore, it is advantageous for securing the high workability.

Further, in the power converter 100 according to this embodiment, since the coupling part 153c of the busbar 153 has the vertically extending part provided so that it extends in the up-and-down direction at the part separated from the coupling part 152c of the busbar 152 and the coupling part 154c of the busbar 154, the vertically extending part of the coupling part 153c of the busbar 153 deforms independently, if an impact load is inputted into the vehicle V from the front. For this reason, in the power converter 100, a part of the impact load can be absorbed by the deformation of the coupling part 153c of the busbar 153, thereby suppressing short circuits of the other busbars 152 and 154 and action of the impact load on the power module part 140. Therefore, the power converter 100 is advantageous by securing the high safety of the vehicle V carrying the power converter 100.

Further, in the power converter 100 according to this embodiment, since the connector accommodating part which accommodates the AC connector part 150 of the case 101 is disposed so that it is located on the input side of the impact load (front side), and the end part 150a of the case 101 on the connector accommodating part side is disposed so that it becomes flush with the first motor housing 511, the impact load will not be intensively inputted into the end part 150a of the case 101 of the power converter 100 even if the impact load is inputted from the front, thereby securing the high safety.

Further, in the power converter 100 according to this embodiment, since the coupling parts 152c, 153c, and 154c of all the busbars 152-154 are molded integrally by the resin mold part 155, the three busbars 152-154 can be handled as one component. Therefore, the high workability can be secured when assembling the power converter 100, as compared with the case where the three busbars 152-154 are handled independently.

As described above, in the power converter 100 according to this embodiment, the appearance size can be reduced, while securing the workability in association with the connection of the busbars 152-154 to the connector 156.

Second Embodiment

A power converter 160 according to a second embodiment of the present disclosure is described with reference to FIGS. 11 and 12. Note that the power converter 160 according to this embodiment has the same configuration as the first embodiment, except that it is connected to a three-phase four-wire motor M. For this reason, in FIGS. 11 and 12, a partial configuration of an AC connector part 250 is selectively illustrated. Further, below, explanation of the part overlapping with the first embodiment is omitted.

Figure 11:
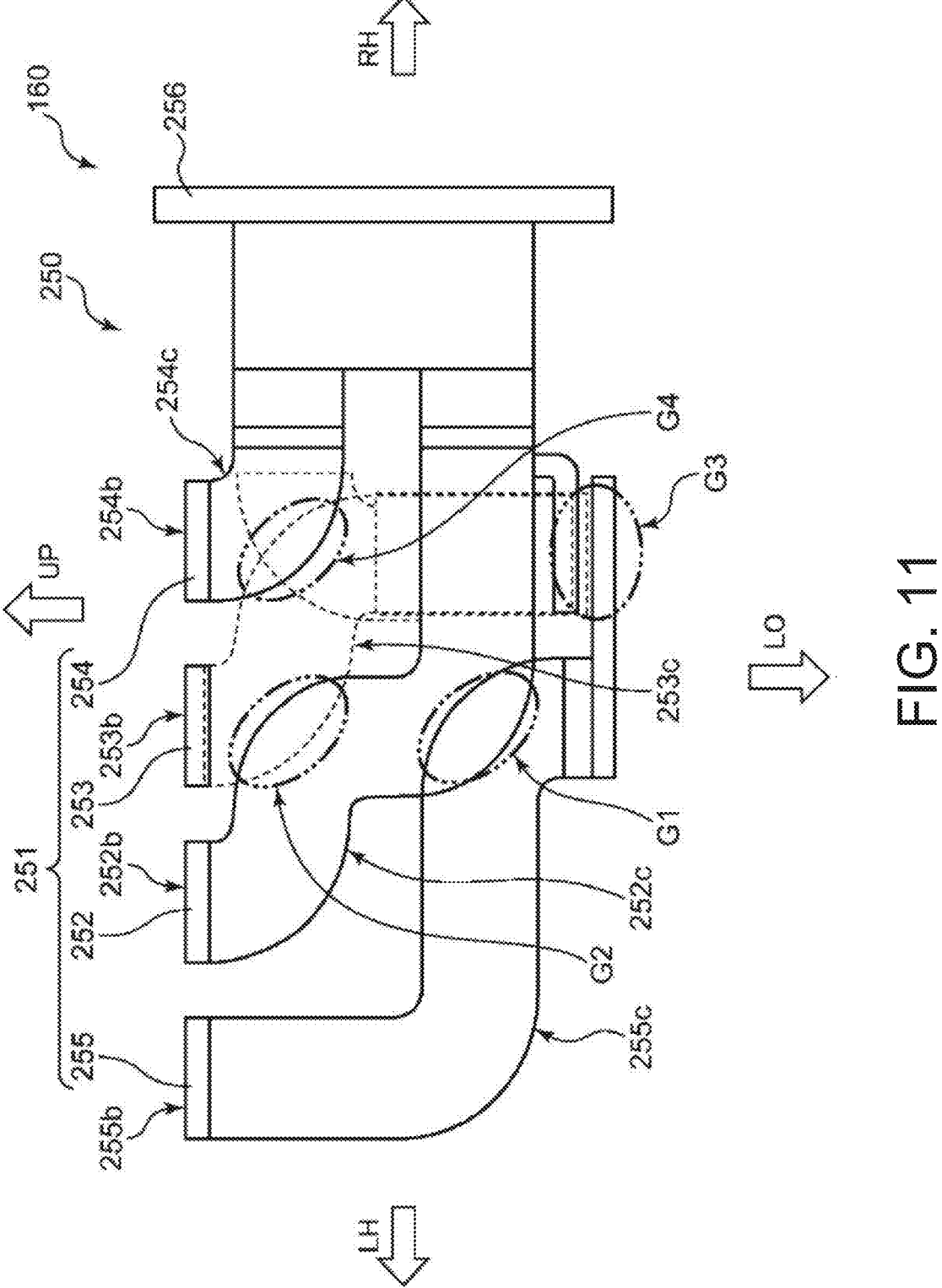
FIG. 11 is a rear view illustrating a partial configuration of an AC connector part, of a configuration of a power converter according to a second embodiment of the present disclosure.
Figure 12:
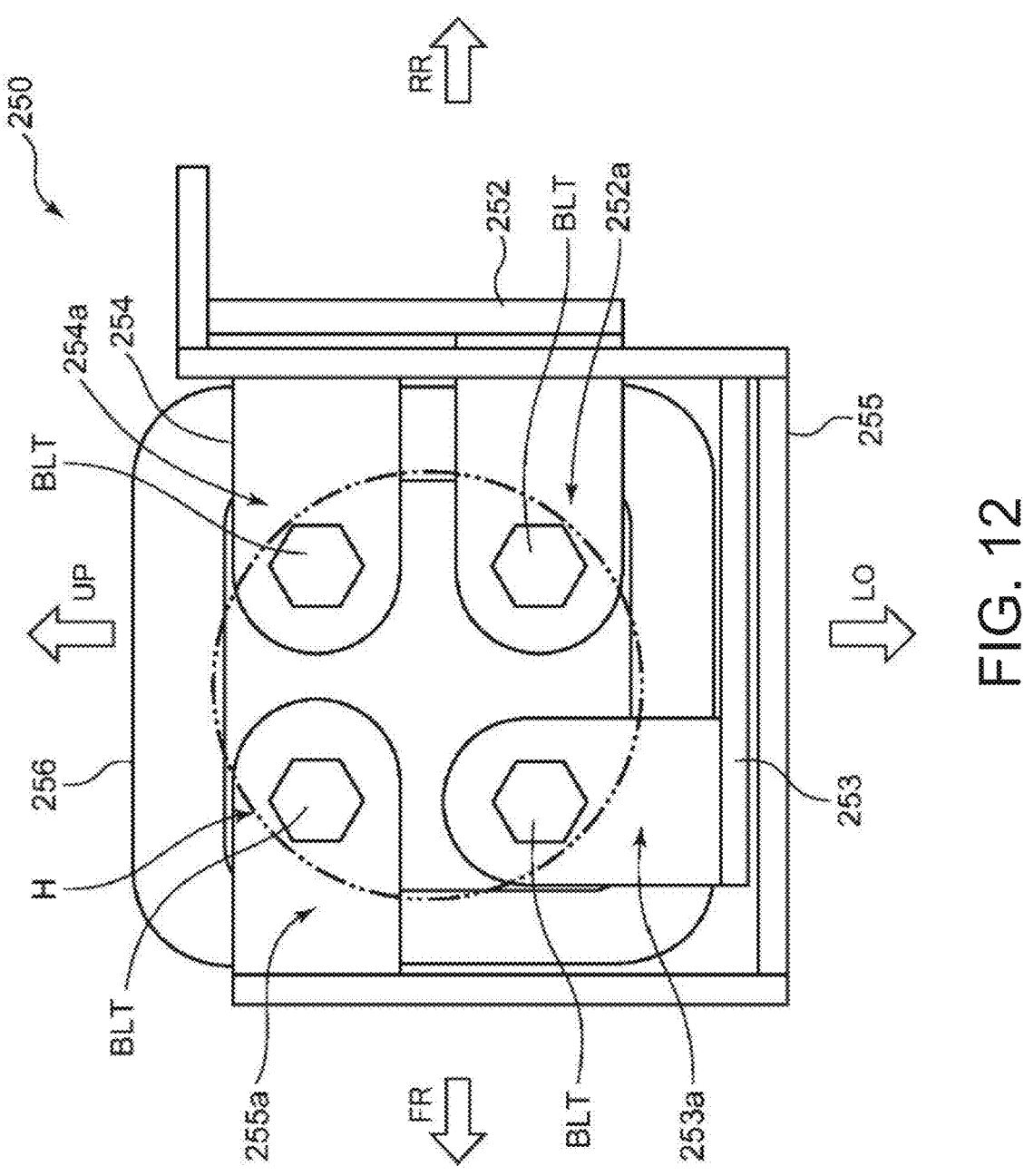
FIG. 12 is a side view illustrating a partial configuration of the AC connector part.

As illustrated in FIGS. 11 and 12, the power converter 160 is an inverter device connected to the three-phase four-wire AC motor M. The AC connector part 250 of the power converter 160 has a connector 256 and an AC busbar module 251 which are used for the electric connection with the motor M. The power converter 160 also sends out AC power toward the motor M via the AC connector part 250. Further, when the motor M functions as a power generator as the vehicle V decelerates, the power converter 160 accepts the AC power from the motor M via the AC connector part 250.

As illustrated in FIG. 12, the connector 256 has four connection points (H area). Each connection point has a cylindrical shape, similarly to the connection points 156a-156c of the first embodiment.

In the AC connector part 250, the AC busbar module 251 is connected to the connector 256 by being fastened with bolts BLT. As illustrated in FIGS. 11 and 12, the AC busbar module 251 has four busbars 252-255 and a resin mold part. Note that, in FIGS. 11 and 12, illustration of the resin mold part is omitted.

In this embodiment, as one example, the busbar 252 is a U-phase busbar, the busbar 253 is a V-phase busbar, the busbar 254 is a W-phase busbar, and the busbar 255 is a neutral (N-phase) busbar.

As illustrated in FIGS. 11 and 12, the busbar (first busbar) 254 has a connecting part (first connecting part) 254a connected with a W-phase connection point (first connection point) of the connector 256, a module-side connecting part 254b connected with a W-phase IGBT of the power module part, and a coupling part (first coupling part) 254c which continuously couples the connecting part 254a to the module-side connecting part 254b.

The busbar (second busbar) 253 has a connecting part (second connecting part) 253a connected with a V-phase connection point (second connection point) of the connector 256, a module-side connecting part 253b connected with a V-phase IGBT of the power module part, and a coupling part (second coupling part) 253c which continuously couples the connecting part 253a to the module-side connecting part 253b.

The busbar (third busbar) 252 has a connecting part (third connecting part) 252a connected with a U-phase connection point (third connection point) of the connector 256, a module-side connecting part 252b connected with a U-phase IGBT of the power module part, and a coupling part (third coupling part) 252c which continuously couples the connecting part 252a to the module-side connecting part 252b.

The busbar 255 has a connecting part 255a connected with a neutral-line connection point connected at the neutral point of the motor M of the connector 256, a module-side connecting part 255b connected to a neutral-line IGBT of the power module part, or the neutral line itself, and a coupling part 255c which continuously couples the connecting part 255a to the module-side connecting part 255b.

Although illustration is omitted, the resin mold part is made of insulating material (e.g., epoxy resin), covers outer circumferential parts of the busbars 252-255, and is inserted in gaps between the busbars 252-255, as in the first embodiment. Therefore, the AC busbar module 251 is handled as one component when assembling the power converter 160.

Next, a routing structure of the coupling parts 252c, 253c, 254c, and 255c of the busbars 252-255 is described.

As illustrated in FIG. 12, the connecting part 254a of the busbar 254 is offset rearwardly from the connecting parts 253a and 255a of the busbars 253 and 255. The connecting part 252a of the busbar 252 is also offset rearwardly from the connecting parts 253a and 255a of the busbars 253 and 255, and is disposed at substantially the same position as the connecting part 254a of the busbars 254 in the front-and-rear direction.

Although detailed illustration is omitted, the coupling parts 252c, 253c, 254c, and 255c of the busbars 252-255 have parts which extend linearly in the front-and-rear direction, and are parallel to each other adjacent to the module-side connecting parts 252b, 253b, 254b, and 255b, respectively. Also in this embodiment, a current sensor is attached to the linearly-extending part of each of the busbars 252-255.

As illustrated in FIG. 11, the coupling parts 252c, 253c, 254c, and 255c of the busbars 252-255 are bent downwardly at the front ends of the linearly-extending parts in the front-and-rear direction. As illustrated in FIGS. 11 and 12, the coupling part 254c of the busbar 254 extends rightwardly from the downwardly-extending part, further extends forwardly, and is coupled to the connecting part 254a.

The coupling part 253c of the busbar 253 extends rightwardly from the downwardly-extending part, further extends downwardly, forwardly, and upwardly, and is coupled to the connecting part 253a. Here, as illustrated in FIG. 12, in the busbar 253, the coupling part 253c is coupled to the connecting part 253a from below. Further, the coupling part 253c of the busbar 253 is routed so that it does not cross the H area where the four connection points of the connector 256 are disposed. That is, the coupling part 253c of the busbar 253 does not cross the H area in the front-and-rear direction where the four connection points of the connector 256 are disposed, but it is routed so that it bypasses below the outer circumference of this area.

The coupling part 252c of the busbar 252 extends rightwardly from the downwardly-extending part, further extends downwardly, rightwardly, and forwardly, and is coupled to the connecting part 252a. As illustrated in FIG. 12, in the busbar 252, the coupling part 252c is coupled to the connecting part 252a from the rear. Further, the coupling part 252c of the busbar 252 is routed so that it does not cross the H area of the connector 256. That is, the coupling part 252c of the busbar 252 does not cross the H area, either, but it is routed so that it bypasses the rear of the outer circumference of this area.

The coupling part 255c of the busbar 255 extends rightwardly from the downwardly-extending part, further extends downwardly, forwardly, upwardly, and rearwardly, and is coupled to the connecting part 255a. As illustrated in FIG. 12, in the busbar 255, the coupling part 255c is coupled to the connecting part 255a from the front. Further, the coupling part 255c of the busbar 255 is routed so that it does not cross the H area of the connector 256. That is, the coupling part 255c of the busbar 255 does not cross the H area either, but is instead routed so that it bypasses the rear of the outer circumference of this area.

Also in the AC connector part 250 of this embodiment, the coupling parts 252c, 253c, 254c, and 255c of the four busbars 252-255 are routed so that only two of the busbars overlap with each other in the part where the busbars overlap with each other (the part where the principal surfaces oppose each other). In detail, although the coupling part 254c of the busbar 254 and the coupling part 253c of the busbar 253 oppose each other at G4 part in FIG. 11, the coupling parts 252c and 255c of other busbars 252 and 255 are routed so that they are separated therefrom at this part.

Although the coupling part 253c of the busbar 253 and coupling part 252c of the busbar 252 oppose each other at G2 part in FIG. 11, the coupling parts 254c and 255c of other busbars 254 and 255 are routed so that they are separated therefrom at this part.

Although the coupling part 252c of the busbar 252 and the coupling part 255c of the busbar 255 oppose each other at G1 part in FIG. 11, the coupling parts 253c and 254c of other busbars 253 and 254 are routed so that they are separated therefrom at this part.

Although the coupling part 253c of the busbar 253 and the coupling part 255c of the busbar 255 oppose each other at G3 part in FIG. 11, the coupling parts 252c and 254c of the busbars 252 and 254 are routed so that they are separated therefrom at this part.

Since the coupling parts 252c, 253c, 254c, and 255c of the busbars 252-255 are routed so that only two of the coupling parts are overlapped with each other at most as described above, the thickness of the overlapping part (the part where the principal surfaces oppose each other) can be reduced, as compared with the case where three or all the coupling parts 252c, 253c, 254c, and 255c of the four busbars 252-255 overlap with each other.

The power converter 160 according to this embodiment also has the same configuration as the first embodiment, except for the AC connector part 250 having the four busbars 252-255. Therefore, the power converter 160 according to this embodiment can also achieve the same effects as the first embodiment.

Here, the neutral line of the three-phase four-wire type may be grounded by electrically connecting it to a vehicle body part which is possible to be grounded, or the negative electrode of the battery. In this case, since the busbar 255 connected to the neutral line is located forward of the busbars 252-254, the risk of short circuit with a case (not illustrated) of the power converter 160 can further be reduced as compared with the first embodiment, when an impact load is inputted to the case from the front. Therefore, the power converter 160 is advantageous for securing the high safety of the vehicle V carrying the power converter 160.

Third Embodiment

A power converter 170 according to a third embodiment of the present disclosure is described with reference to FIGS. 13 and 14. Note that the power converter 170 according to this embodiment has the same configuration as the first embodiment, except for the power converter 170 being connected to a single-phase two-wire motor M. For this reason, in FIGS. 13 and 14, a partial configuration of an AC connector part 350 is selectively illustrated. Note that, below, explanation of the part overlapping with the first embodiment is omitted.

Figure 13:
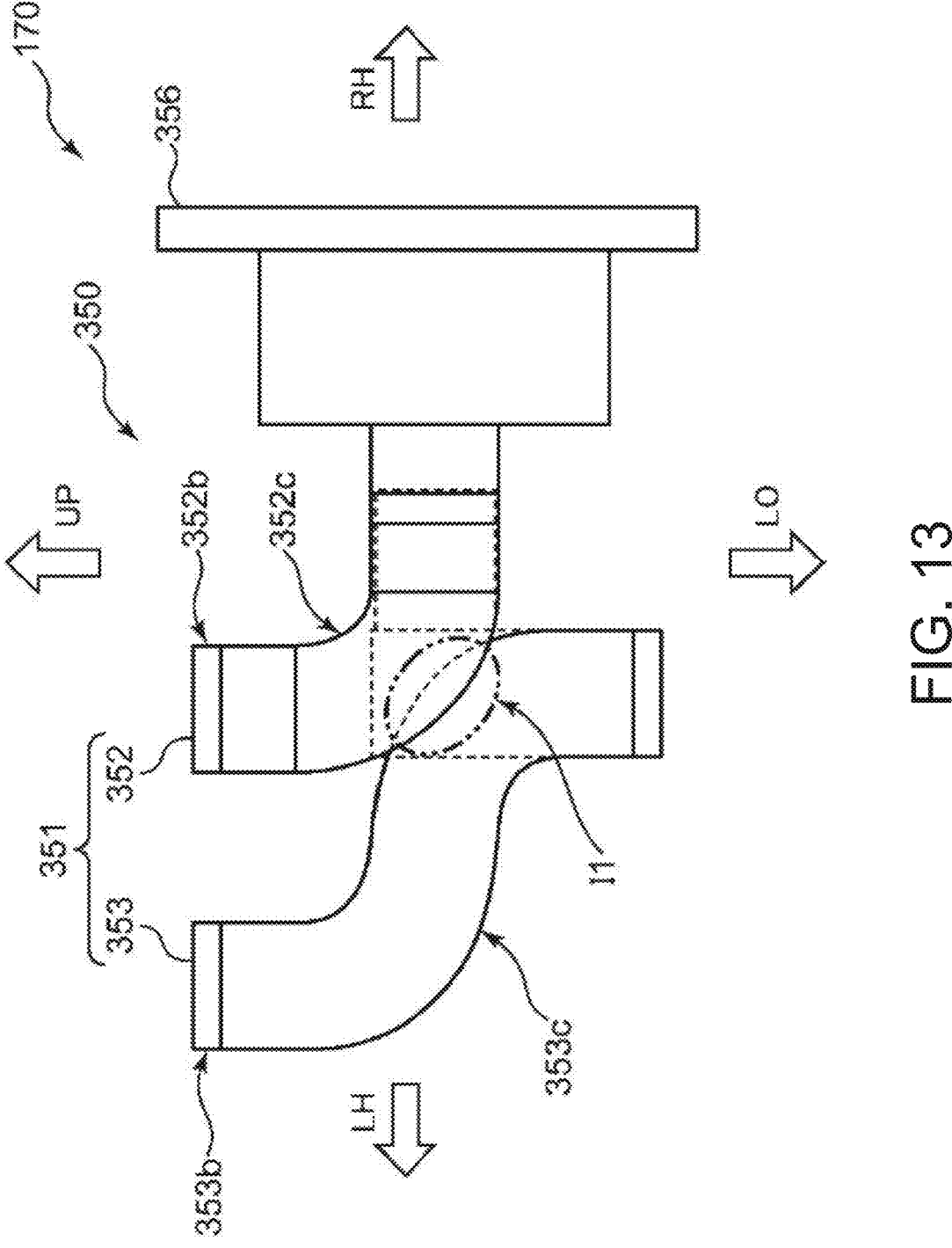
FIG. 13 is a rear view illustrating a partial configuration of an AC connector part, of a configuration of a power converter according to a third embodiment of the present disclosure.
Figure 14:
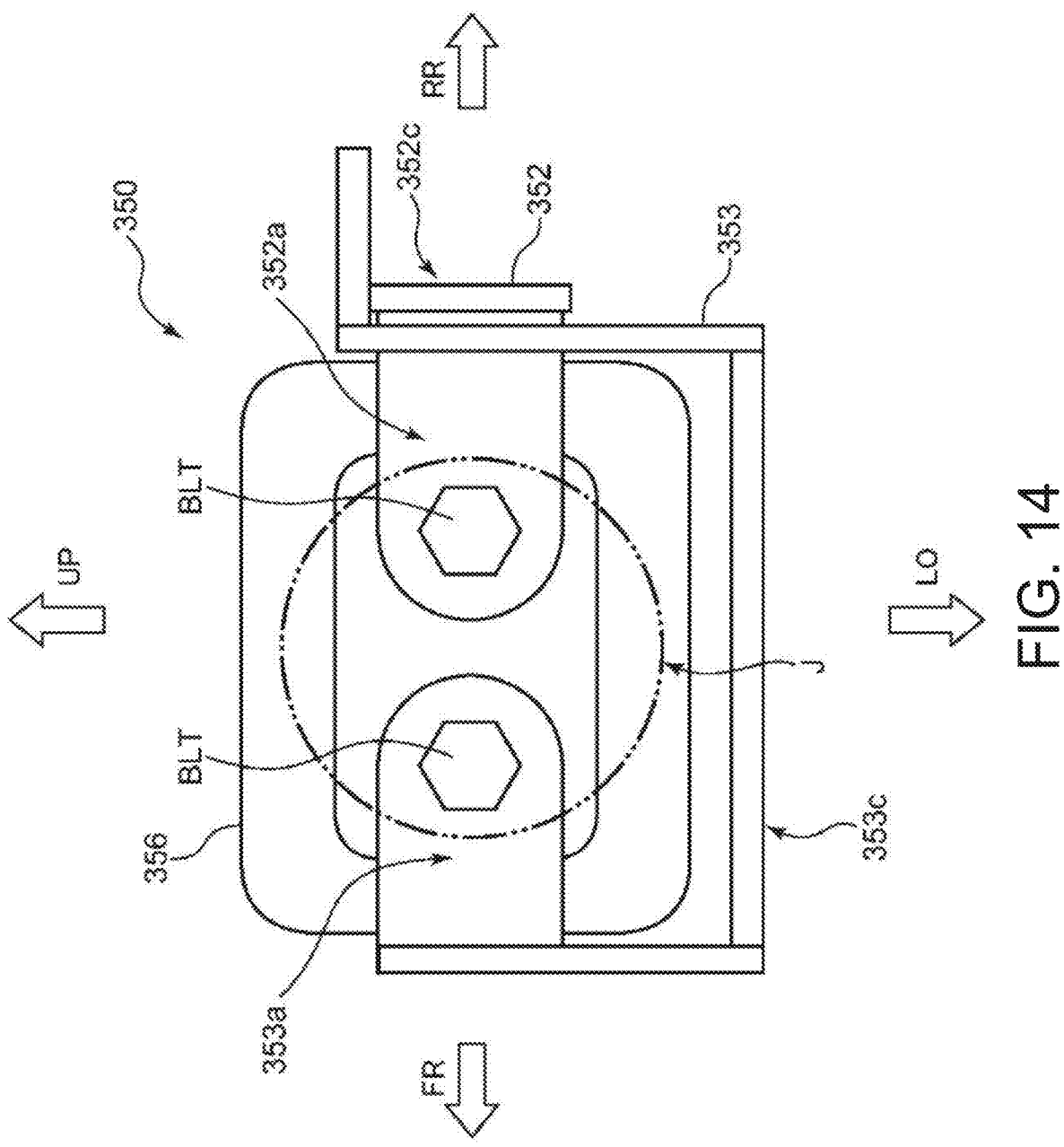
FIG. 14 is a side view illustrating the partial configuration of the AC connector part.

As illustrated in FIGS. 13 and 14, the power converter 170 is an inverter device connected to the single-phase two-wire AC motor M. The AC connector part 350 of the power converter 170 has a connector 356 and an AC busbar module 351 which are used for the electric connection with the motor M. The power converter 170 also sends out AC power toward the motor M via the AC connector part 350. Further, when the motor M functions as a power generator as the vehicle V decelerates, the power converter 170 accepts the AC power from the motor M via the AC connector part 350.

As illustrated in FIGS. 13 and 14, the connector 356 has two connection points (J area). Each connection point has a cylindrical shape, similarly to the connection points 156a-156c of the first embodiment.

In the AC connector part 350, the AC busbar module 351 is connected to the connector 356 by being fastened with bolts BLT. As illustrated in FIGS. 13 and 14, the AC busbar module 351 has two busbars 352 and 353 and a resin mold part. In FIGS. 13 and 14, illustration of the resin mold part is omitted.

In this embodiment, as one example, the busbar 352 is a U-phase busbar, and the busbar 353 is an N-phase busbar. The busbar (first busbar) 352 has a connecting part (first connecting part) 352a connected with a U-phase connection point (first connection point) of the connector 356, a module-side connecting part 352b connected with a U-phase IGBT of the power module part, and a coupling part (first coupling part) 352c which continuously couples the connecting part 352a to the module-side connecting part 352b.

The busbar (second busbar) 353 has a connecting part (second connecting part) 353a connected with an N-phase connection point (second connection point) of the connector 356, a module-side connecting part 353b connected with an N-phase IGBT of the power module part, and a coupling part (second coupling part) 353c which continuously couples and the connecting part 353a to the module-side connecting part 353b.

Although illustration is omitted, the resin mold part is made of insulating material (e.g., epoxy resin), covers outer circumferential parts of the busbars 352 and 353, and is inserted into gaps between the busbars 352 and 353, as in the first embodiment. Therefore, the AC busbar module 351 is handled as one component when assembling the power converter 170.

Then, a routing structure of the coupling parts 352c and 353c of the busbars 352 and 353 is described.

As illustrated in FIG. 14, the connecting part 353a of the busbar 353 is offset forward from the connecting part 352a of the busbar 352. Although detailed illustration is omitted, the coupling parts 352c and 353c of the busbars 352 and 353 have parts which extend linearly in the front-and-rear direction and are parallel to each other, adjacent to the module-side connecting parts 352b and 353b, respectively. Also in this embodiment, a current sensor is attached to the linearly-extending part of each of the busbars 352 and 353.

As illustrated in FIG. 13, the coupling parts 352c and 353c of the busbars 352 and 353 are bent downwardly at front ends of the linearly-extending parts in the front-and-rear direction. As illustrated in FIGS. 13 and 14, the coupling part 352c of the busbar 352 extends rightwardly from the downwardly-extending part, further extends forwardly, and is coupled to the connecting part 352a.

The coupling part 353c of the busbar 353 extends rightwardly from the downwardly-extending part, further extends downwardly, forwardly, upwardly, and rearwardly, and is coupled to the connecting part 353a. Here, as illustrated in FIG. 14, in the busbar 353, the coupling part 353c is coupled to the connecting part 353a from the front. Further, the coupling part 353c of the busbar 353 is routed so that it does not cross the J area where the two connection points of the connector 356 are disposed. That is, the coupling part 353c of the busbar 353 is routed so that it does not cross in the front-and-rear direction the J area where the two connection points of the connector 356 are disposed, but it bypasses below the outer circumference of this area.

Further, in the AC connector part 350 of this embodiment, since only two busbars 352 and 353 are provided, it is not possible that three or more busbars oppose each other. That is, as illustrated in FIG. 13, only the coupling part 352c of the busbar 352 and the coupling part 353c of the busbar 353 oppose each other at I1 part.

The power converter 170 according to this embodiment also has the same configuration as the first embodiment, except for the AC connector part 350 having the two busbars 352 and 353. Therefore, the power converter 170 according to this embodiment can also achieve the same effect as the first embodiment.

Modifications

Although in the first to third embodiments the inverter device is adopted as one example of the power converters 100, 160, and 170, the present disclosure is not limited to this configuration. For example, the present disclosure may be applied to a DC-DC converter.

Further, although in the first to third embodiments the power converters 100, 160, and 170 carried in the vehicle V are used as examples, the present disclosure may be applied to power converters used in industrial machinery. Further, as the vehicle, not only the hybrid electric vehicle (HEV) but also a battery electric vehicle (BEV) which is not provided with an engine as a driving source for propelling the vehicle may be adopted.

Further, although in the first to third embodiments the AC busbar modules 151, 251, and 351 of the AC connector parts 150, 250, and 350 are adopted as examples, the present disclosure may be applied to a DC connector part.

Further, although in the first to third embodiments the AC busbar modules 151, 251, and 351 have the resin mold part 155, the resin mold part is not an essential configuration in the present disclosure. In this case, it is desirable to keep the gap between the adjacent busbars more than the insulation distance, or to insert an insulating material at a part where the adjacent busbars are close to each other.

Further, although in the first to third embodiments it is possible to access from above the areas E1, H, and J of the connectors 156, 256, and 356, it is not necessary to access from above in the present disclosure. That is, the connection points of the busbars to the connector may be accessible from any of the front, the rear, or below. Note that when defining the direction of access as described above, it is desirable to provide the opening in the case accordingly.

Further, although in the first to third embodiments the IGBT is adopted as one example of the power module, the present disclosure is not limited to this configuration for the type of power module. For example, it is also possible to adopt a MOSFET (Metal Oxide Semiconductor Filed Effect Transistor), or a module in which a switching element and a diode element are combined.

Further, although in the first to third embodiments the busbars 152-154, 252-255, and 352 and 353 are connected to the connectors 156, 256, and 356 with the bolts BLT, the present disclosure is not limited to this configuration for the connection of the busbars to the connector. For example, connection with nuts, connection by crimping, and connection by welding may be adopted.

Further, although in the first to third embodiments the power converters 100, 160, and 170 are disposed so that the end part (front end part) 150a of the AC connector parts 150, 250, and 350 faces forward, the present disclosure is not limited to this configuration for the orientation of the power converter. That is, it is also possible to dispose the power converter so that the end of the AC connector part faces the rear or either the left or the right.

Further, although in the first to third embodiments the power converters 100, 160, and 170 are disposed so that the front end part 150a of the AC connector parts 150, 250, and 350 becomes flush with the front end part 511a of the first motor housing 511, it is also possible to dispose the power converter in the present disclosure so that the front end of the AC connector part is located at a position rearward from the motor housing or the axle housing. Also in this case, it can be suppressed that the load is intensively applied to the power converter in a collision of the vehicle.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS 100, 160, 170 Power Converter
144a IGBT (First Power Module)
144b IGBT (Second Power Module)
144c IGBT (Third Power Module)
150, 250, 350 AC Connector Part
152, 252, 352 U-phase Busbar
153, 253 V-phase Busbar
154, 254 W-phase Busbar
155 Resin Mold Part
156, 256, 356 Connector
156a Connection Point (First Connection Point)
156b Connection Point (Second Connection Point)
156c Connection Point
255, 353 N-phase Busbar
511, 521 Motor Housing
531 Axle Housing
M Motor

What is claimed is:

1. A power converter, comprising:
a power module part having n power modules, n being an integer of 2 or more; and
a connector part having n busbars connected to the n power modules, respectively, and a connector connected to the n busbars and to be connected with an external apparatus,
wherein each of the n busbars has a connecting part connected to the connector, a module-side connecting part connected to a respective one of the n power modules, and a coupling part continuously coupling the connecting part to the module-side connecting part, wherein the n power modules include a first power module and a second power module that are lined up in a first direction, wherein the connector has n connection points connected with the connecting parts of the n busbars, respectively, the n connection points being disposed in a plane intersecting with the first direction, wherein the busbar connected to the first power module is a first busbar, the connecting part of the first busbar is a first connecting part, the coupling part of the first busbar is a first coupling part, the busbar connected to the second power module is a second busbar, the connecting part of the second busbar is a second connecting part, the coupling part of the second busbar is a second coupling part, one of the n connection points to which the first connecting part is connected is a first connection point, and another of the n connection points to which the second connecting part is connected is a second connection point, wherein the first connection point and the second connection point are offset in a second direction intersecting with the first direction, and the first connection point is disposed closer to the power module part than the second connection point in the second direction, and wherein the second coupling part has a length longer than the first coupling part, and the second coupling part is routed so as to bypass outside of an area of the connector where the n connection points are disposed, when seen in the first direction.

2. The power converter of claim 1, wherein the connector part is an AC connector part configured to perform input and output of three-phase AC power to and from the external apparatus, wherein n is 3, wherein the power module part includes a third power module further lined up with the first power module and the second power module in the first direction, wherein the busbar connected to the third power module is a third busbar, the connecting part of the third busbar is a third connecting part, the coupling part of the third busbar is a third coupling part, and one of the n connection points to which the third connecting part is connected is a third connection point, wherein the first connection point, the second connection point, and the third connection point are disposed annularly, when seen in a plan view in the first direction, and wherein the third coupling part has a length longer than the first coupling part, and the third coupling part is routed so as to bypass outside of the area of the connector where the n connection points are disposed, when seen in the plan view in the first direction.

3. The power converter of claim 2, wherein the first coupling part, the second coupling part, and the third coupling part are routed so that the first coupling part and the third coupling part oppose each other at a first spot, while the second coupling part does not oppose the first coupling part and the third coupling part at the first spot, and the second coupling part and the third coupling part oppose each other at a given second spot, while the first coupling part does not oppose the second coupling part and the third coupling part at the second spot.

4. The power converter of claim 3, wherein the n busbars are molded by insulating material so that the coupling parts become integral.

5. The power converter of claim 3, wherein the connector part is further connected to a neutral-line busbar that is connected to a neutral point of the motor.

6. The power converter of claim 2, further comprising a case including a case body having an opening on one side in a third direction intersecting with both the first direction and the second direction, and accommodating the power module part and the connector part, and a lid configured to close the opening of the case body, wherein the second coupling part and the third coupling part are routed so as to bypass the n connection points of the connector, on the opposite side from the one side in the third direction.

7. The power converter of claim 6, wherein the power converter and the external apparatus are mounted on a vehicle, and wherein the one side in the third direction is upward of the vehicle.

8. The power converter of claim 7, wherein the second connection point is disposed on an input side of an impact load expected in the vehicle, from the first connection point and the third connection point, and wherein the second coupling part has a part adjacent to the second connecting part, the part extending in the up-and-down direction of the vehicle and being separated from the first coupling part and the third coupling part.

9. The power converter of claim 8, wherein the n busbars are molded by insulating material so that the coupling parts become integral.

10. The power converter of claim 8, wherein the connector part is further connected to a neutral-line busbar that is connected to a neutral point of the motor.

11. The power converter of claim 7, wherein the external apparatus is a motor for propelling the vehicle, and has a motor housing serving as an outer cell, wherein a transmission having an axle housing serving as an outer cell is also mounted on the vehicle, and is disposed adjacent to the external apparatus, wherein the case of the power converter is disposed on a housing of at least one of the motor housing and the axle housing so that a part of the case where the connector part is accommodated is located on the input side of the impact load, from a part of the case where the power module part is accommodated, and wherein an end of the case on the input side of the impact load is flush with the motor housing or the axle housing, or is located on the opposite side from the input side, compared to the motor housing or the axle housing.

12. The power converter of claim 11, wherein the connector part is further connected to a neutral-line busbar that is connected to a neutral point of the motor.

13. The power converter of claim 7, wherein the n busbars are molded by insulating material so that the coupling parts become integral.

14. The power converter of claim 7, wherein the connector part is further connected to a neutral-line busbar that is connected to a neutral point of the motor.

15. The power converter of claim 6, wherein the n busbars are molded by insulating material so that the coupling parts become integral.

16. The power converter of claim 6, wherein the connector part is further connected to a neutral-line busbar that is connected to a neutral point of the motor.

17. The power converter of claim 2, wherein the n busbars are molded by insulating material so that the coupling parts become integral.

18. The power converter of claim 2, wherein the connector part is further connected to a neutral-line busbar that is connected to a neutral point of the motor.

19. The power converter of claim 1, wherein the n busbars are molded by insulating material so that the coupling parts become integral.

20. The power converter of claim 1, wherein the connector part is further connected to a neutral-line busbar that is connected to a neutral point of the motor.

\* \* \* \* \*